(12) United States Patent
Nolen et al.

(10) Patent No.: US 6,594,946 B2
(45) Date of Patent: Jul. 22, 2003

(54) MOSQUITO AND BITING INSECT ATTRACTING AND KILLING APPARATUS

(75) Inventors: James A. Nolen, West Greenwich, RI (US); Doug Winner, Newtown, CT (US); Judith Brooks, West Hartford, CT (US); John Laverack, Southbury, CT (US); Greg Weaver, Seymour, CT (US); Randy May, Andover, KS (US); Robert Mosher, Wichita, KS (US); Richard Long, Wichita, KS (US); Bob Bruno, Avon, CT (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/981,330

(22) Filed: Oct. 17, 2001

(65) Prior Publication Data

US 2003/0070345 A1 Apr. 17, 2003

(51) Int. Cl.[7] .......................... A01M 1/02; A01M 1/14; A01M 1/22
(52) U.S. Cl. .............................. 43/114; 43/112; 43/107
(58) Field of Search .......................... 43/113, 114, 107, 43/132.1, 112, 115, 58; 431/253, 344; 126/48, 85 R, 92 B, 92 C, 201, 255, 256, 258

(56) References Cited

U.S. PATENT DOCUMENTS

| | | | | |
|---|---|---|---|---|
| 449,138 A | * | 3/1891 | Roth ........................... | 43/113 |
| 550,345 A | * | 11/1895 | Humphreys et al. .......... | 43/113 |
| 636,710 A | * | 11/1899 | Blanchard ................. | 126/85 R |
| 718,834 A | | 1/1903 | Godfrey | |
| 834,228 A | * | 10/1906 | Blanchard ................. | 126/85 R |
| 849,323 A | * | 4/1907 | Blanchard ................. | 126/85 R |
| 916,305 A | * | 3/1909 | Haefele ....................... | 43/113 |
| 1,087,921 A | | 2/1914 | Caldwell | |
| 1,282,998 A | * | 10/1918 | Walker ...................... | 126/85 R |
| 1,332,474 A | * | 3/1920 | Skelly ........................ | 126/201 |

(List continued on next page.)

FOREIGN PATENT DOCUMENTS

| | | | | |
|---|---|---|---|---|
| DE | 244758 B1 | * | 3/1912 | .................. 43/113 |
| DE | 169968 B1 | * | 12/1951 | .................. 43/113 |
| DE | 3840440 A1 | | 10/1989 | |
| EP | 09035212 | | 9/1998 | |
| GB | 20798 B1 | * | 10/1908 | .................. 43/113 |

OTHER PUBLICATIONS

Anonymous, "Taking Back Neighborhoods One Yard at a Time; Assembly and Operating Manual," *American Biophysics Corp.*, pp. 1–11, Rev. Oct. 26, 2000.

Copy of Invitation to Pay Additional Fees with partial international search (Annex) by the EPO (Jan. 27, 2003).

Copy of International Search Report by the EPO (Mar. 31, 2003).

*Primary Examiner*—Darren W. Ark
(74) *Attorney, Agent, or Firm*—Leydig, Voit & Mayer, Ltd

(57) ABSTRACT

A mosquito and biting insect attracting apparatus that includes a heat element (a thermal lure), a source of carbon dioxide ($CO_2$), and a source of a chemical biting insect attractant, such as octenol. The heat for the thermal lure and the source of $CO_2$ are provided by a propane flame. The thermal lure includes a structure that surrounds a propane burner and that is heated by the burner to a temperature that is similar to that of a small animal, such as 95 to 115 degrees Fahrenheit. The structure includes a series of baffles and conduction elements that permit the structure to have a substantially constant heat signature, which is desirable for attracting mosquitoes and other biting insects. A mechanism may be provided for trapping or killing the attracted mosquitoes, such as an adhesive substance or an electronic grid.

44 Claims, 12 Drawing Sheets

U.S. PATENT DOCUMENTS

| | | | |
|---|---|---|---|
| 1,502,200 A | * 7/1924 | Howlett et al. | 126/85 R |
| 1,685,241 A | 9/1928 | Northrup | |
| 1,816,110 A | * 7/1931 | Cannon | 126/92 C |
| 2,258,683 A | 10/1941 | Ketterer | |
| 2,264,875 A | 12/1941 | Greuling | |
| 3,685,199 A | 8/1972 | Bradshaw | |
| 3,708,908 A | 1/1973 | Levey | |
| 3,931,865 A | 1/1976 | Levitt | |
| 3,997,999 A | 12/1976 | Evans | |
| 4,121,371 A | 10/1978 | Kaphengst et al. | |
| 4,168,591 A | * 9/1979 | Shaw | 43/114 |
| 4,182,069 A | 1/1980 | De Yoreo | |
| 4,438,584 A | 3/1984 | Baker et al. | |
| 4,519,776 A | * 5/1985 | DeYoreo et al. | 431/268 |
| 4,603,505 A | * 8/1986 | Millard | 43/113 |
| 4,785,573 A | * 11/1988 | Millard | 43/113 |
| 4,907,366 A | 3/1990 | Balfour | |
| 4,962,611 A | * 10/1990 | Millard | 43/113 |
| 5,048,224 A | 9/1991 | Frisch | |
| 5,142,815 A | 9/1992 | Birdsong | |
| 5,203,816 A | * 4/1993 | Townsend | 43/113 |
| 5,205,064 A | 4/1993 | Nolen | |
| 5,231,790 A | * 8/1993 | Dryden et al. | 43/113 |
| 5,255,468 A | 10/1993 | Cheshire, Jr. | |
| 5,274,609 A | * 12/1993 | Bradley | 43/113 |
| 5,577,342 A | 11/1996 | Johnson et al. | |
| 5,588,250 A | 12/1996 | Chiba et al. | |
| 5,608,988 A | 3/1997 | Dowling et al. | |
| 5,647,164 A | * 7/1997 | Yates | 43/113 |
| 5,657,576 A | * 8/1997 | Nicosia | 43/132.1 |
| 5,669,176 A | 9/1997 | Miller | |
| 5,799,436 A | 9/1998 | Nolen et al. | |
| 5,813,166 A | 9/1998 | Wigton et al. | |
| 5,896,695 A | 4/1999 | Walker | |
| 5,915,948 A | 6/1999 | Kunze et al. | |
| 5,943,815 A | * 8/1999 | Paganessi et al. | 43/132.1 |
| 5,950,353 A | 9/1999 | Johnson et al. | |
| 5,950,355 A | 9/1999 | Gilbert | |
| 5,983,557 A | 11/1999 | Perich et al. | |
| 6,033,212 A | * 3/2000 | Bonnema et al. | 43/129 |
| 6,050,025 A | * 4/2000 | Wilbanks | 43/112 |
| 6,055,766 A | * 5/2000 | Nolen et al. | 43/112 |
| 6,088,949 A | * 7/2000 | Nicosia et al. | 43/132.1 |
| 6,108,965 A | 8/2000 | Burrows et al. | |
| 6,145,243 A | 11/2000 | Wigton et al. | |
| 6,161,327 A | 12/2000 | Thomas | |
| 6,195,932 B1 | 3/2001 | Aicher | |
| 6,467,215 B1 | * 10/2002 | Nelson et al. | 43/107 |

* cited by examiner

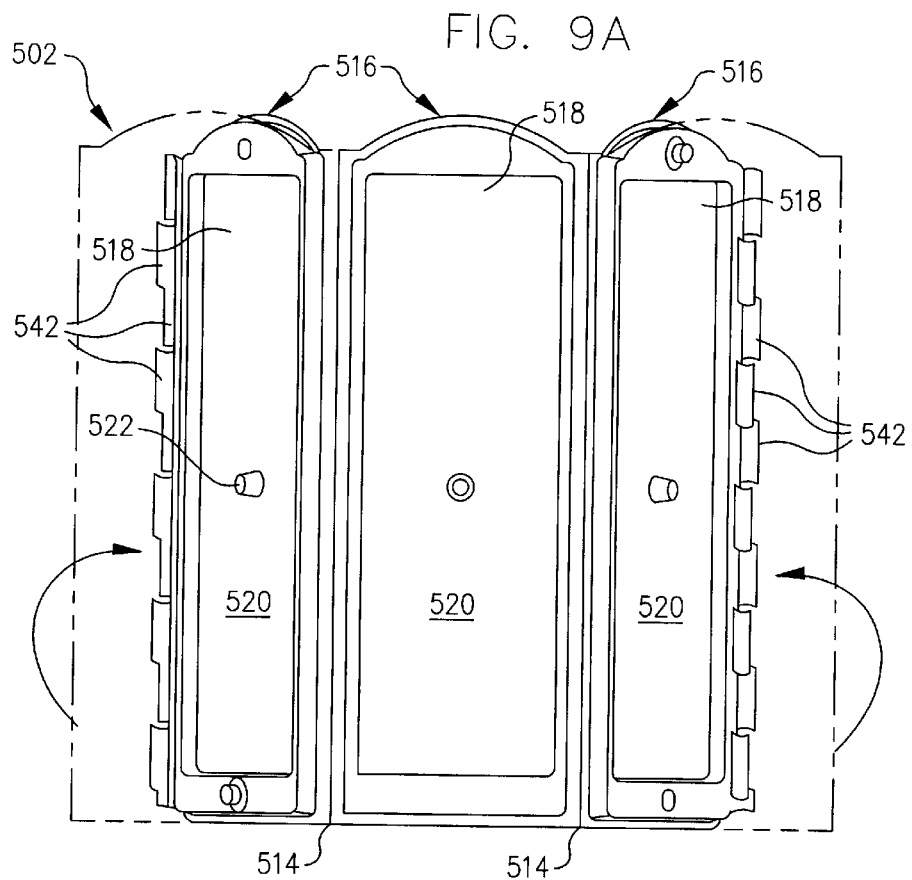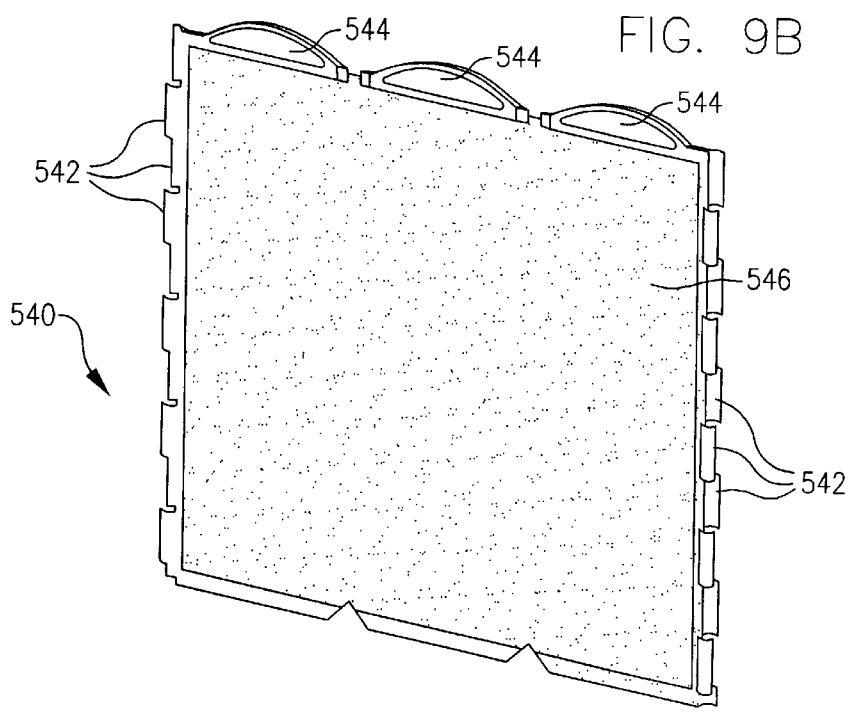

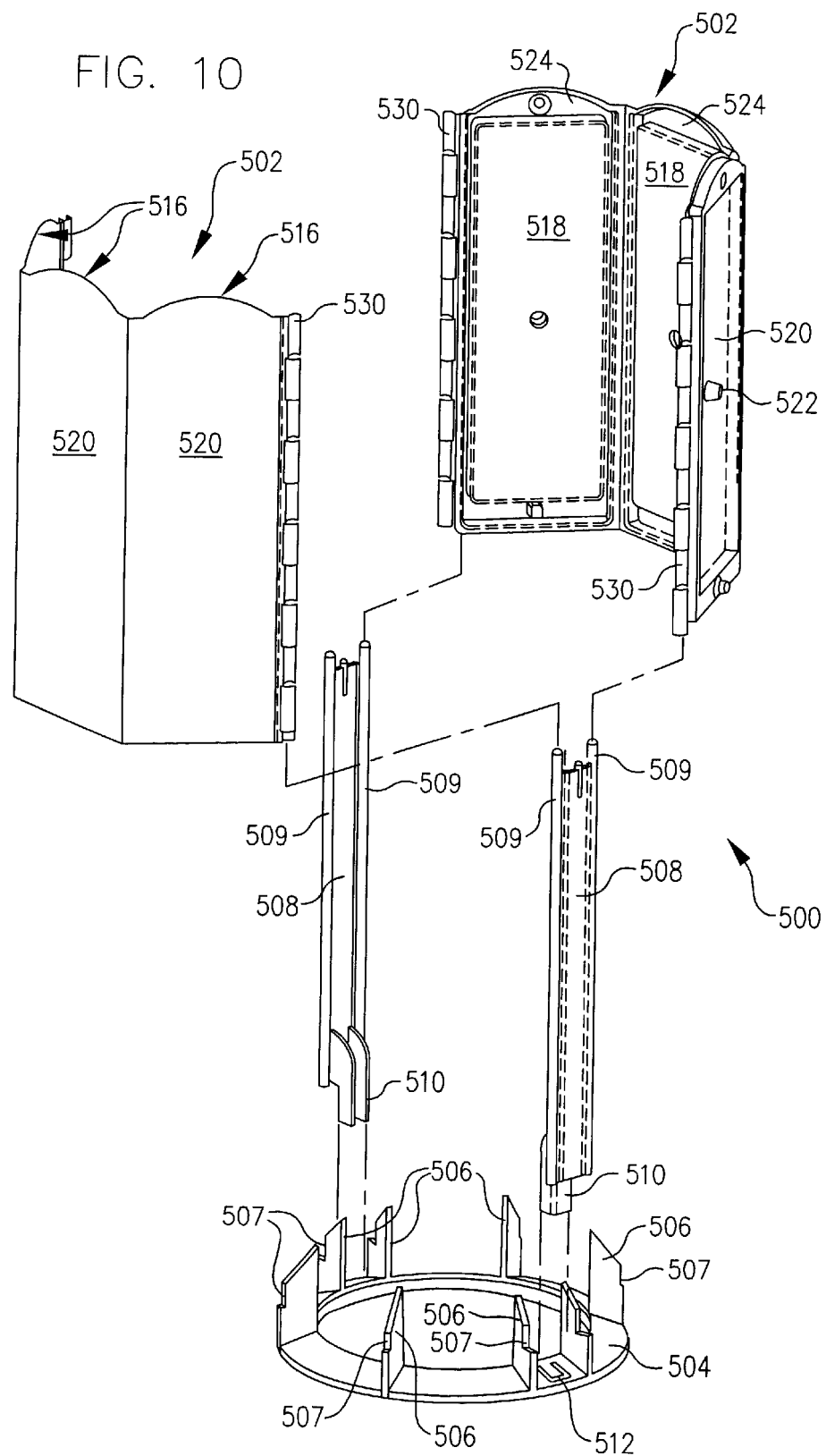

US 6,594,946 B2

MOSQUITO AND BITING INSECT ATTRACTING AND KILLING APPARATUS

FIELD OF THE INVENTION

The present invention relates to insect traps, and more particularly to devices for attracting, and trapping or killing, mosquitoes and other biting insects.

BACKGROUND OF THE INVENTION

Biting insects, such as mosquitoes and flies, can be an annoying, serious problem in man's domain. They interfere with work and spoil hours of leisure time. Their attacks on farm animals can cause loss of weight and decreased milk production. Worldwide, mosquito-borne diseases kill more people than any other single factor. Mosquitoes can be carriers of malaria, yellow fever, and dengue fever in humans. In the United States, mosquitoes spread several types of encephalitis, including the West Nile virus. They also transmit heart worms to cats and dogs.

People are not the primary blood hosts for mosquitoes and biting insects, especially in temperate climates. The major mosquito pests in the southeastern United States seem to prefer the host-odor of small herbivorous (vegetarian) mammals, such as rabbits, or birds. Mosquitoes that carry encephalitis seem to prefer avian (bird) blood hosts. These mosquitoes bite people when they get the chance, but they are better at tracking the scent of animals that are most abundant in their habitat.

Mosquitoes locate blood hosts by scent, sight and heat. From 100 feet away (30 meters) mosquitoes can smell a potential blood host's scent, especially the carbon dioxide ($CO_2$) the blood host exhales. Similarly, biting flies can smell their prey from 300 feet (100 meters) away. Because $CO_2$ is present in the atmosphere (plants take in $CO_2$ and give off oxygen), mosquitoes respond to higher-than-normal concentrations, especially when the $CO_2$ is mixed with host-odor. They follow a blood host's scent upwind, and can see a target at a distance of about 30 feet (10 meters).

People have tried a number of different methods to rid themselves of mosquitoes and other biting insects. One method that is often utilized is spraying or applying chemical insecticides. Although many chemicals work well to kill or repel mosquitoes, the chemicals often have a deleterious effect on the environment, including, but not limited to, killing beneficial insects. In addition, chemical insecticides are effective only for a limited amount of time, and thus must be continuously sprayed. Moreover, many types of mosquitoes and biting insects are capable of developing resistance to the chemical pesticides in a few generations (which may only take a few months for mosquitoes), and in the long run, that adaptation makes the species stronger.

Another method used to combat mosquitoes is bug zappers. In general, a bug zapper includes a fluorescent light source surrounded by an electrified grid. The theory behind these devices is that the mosquitoes are attracted to the light, and, upon flying to the light, will be electrocuted by the grid. In actuality, however, the bug zappers kill beneficial insects, and attract mosquitoes but don't kill them in significant numbers. Thus, individuals that are located near a bug zapper may actually experience more mosquito bites than those that are not.

Citronella candles and smoking coils are often used to repel mosquitoes and other insects. However, research has shown that, in general, an individual must stand within the smoky plume of the citronella to be protected. This, of course, is not desirable. Moreover, even when standing in the plume, citronella is only partly effective in reducing the probability of a mosquito bite. Encouraging natural predation of insects by setting up bird or bat houses in the backyard has also been unsuccessful in reducing local mosquito populations.

Recently, significant research and effort have been expended to develop devices that attract and trap or kill mosquitoes. In general, these devices attempt to replicate the mosquito-attracting attributes of a typical blood host, such as a rabbit or a bird. The devices may include, for example, a source of carbon dioxide, a source of octenol (an alcohol that is given off by mammalian blood hosts), and/or a heat source.

One such device is sold under the trademark "MOSQUITO MAGNET" and is described in U.S. Pat. No. 6,145,243 to Wigton et al. The MOSQUITO MAGNET apparatus is an insect trapping device that generates its own insect attractants of carbon dioxide ($CO_2$), heat, and water vapor through catalytic conversion of a hydrocarbon fuel in a combustion chamber. The hot insect attractants generated in the combustion chamber are diluted and cooled to a temperature above ambient temperature and below about 115 degrees Fahrenheit (F.) by mixing with air, and the mixture is exhausted downward through an exhaust tube. A counterflow of outside air is drawn into the trap though a suction tube that concentrically surrounds the exhaust tube. Biting insects are sucked into the suction tube and are captured in a porous, disposable bag connected to the other end of the suction tube. Additional chemical attractants may be used with the device to make the trap even more effective.

Although the MOSQUITO MAGNET device works well for its intended purpose, it is a very bulky device which cannot reasonably be taken to remote locations such as for camping, boating, or the like. These recreational activities are among the primary arenas where individuals may encounter mosquitoes and other biting insects. Moreover, due to its high suggested retail price ($700 to $1300, depending upon the model), it is far out of reach of the ordinary consumer. Thus, few people would actually purchase the MOSQUITO MAGNET, even if they have a pressing need for mosquito control.

Another example of an apparatus for attracting and destroying insects is disclosed in U.S. Pat. No. 6,055,766, and is sold under the trademark DRAGONFLY. The DRAGONFLY apparatus generally includes a source of carbon dioxide, a source of octenol, a device for emitting the carbon dioxide proximate the source of octenol to create a mixture of the carbon dioxide and octenol, a heating element, and an electrified grid. Insects are initially attracted to the apparatus by the odor associated with the mixture of carbon dioxide and octenol. As the insects fly closer to the apparatus, they are further attracted to the visual properties of the apparatus and then, at close range, they are attracted to the heat emitted by the heating element. In an attempt to fly closer to the heating element, the insects are intercepted by the electrified grid and destroyed.

Although the DRAGONFLY apparatus works well for attracting and capturing insects, its heating source and electrical grid are reliant upon an AC power supply, and thus the portability of the DRAGONFLY apparatus is limited to locations that can be reached by an electrical extension cord. This feature limits the use of the DRAGONFLY apparatus mostly to home use, and even limits the locations where it may be located around a home. Moreover, as with the MOSQUITO MAGNET device, the DRAGONFLY apparatus, at a suggested retail price of approximately $700, is priced out of the price range of the ordinary consumer.

There exists a need for a mosquito attractor and trap that is portable, so that it may be easily moved to a desired location, or used in outdoor recreation, such as camping or boating. Preferably, the mosquito trap may be produced and sold relatively inexpensively, so that it may be purchased by a typical consumer.

SUMMARY OF THE INVENTION

The present invention is directed to a mosquito and biting insect attracting apparatus that is both portable and inexpensive to manufacture. In accordance with one aspect of the present invention, the mosquito and biting insect attracting apparatus includes a heat element (a thermal lure), a source of carbon dioxide ($CO_2$), and a source of a chemical biting insect attractant, such as octenol. The thermal lure, the chemical biting insect attractant, and the $CO_2$ simulate a small animal, thus attracting mosquitoes and other biting insects to the mosquito and biting insect attracting apparatus. A mechanism may be provided for trapping or killing the attracted mosquitoes, such as a sticky adhesive tray or an electronic grid.

In accordance with an aspect of the present invention, the heat for the thermal lure and the source of $CO_2$ are provided by a propane flame. The propane is supplied, for example, by a small propane tank that is attached to the mosquito and biting insect attracting apparatus, and that is mounted, for example, in a bottom portion of the mosquito and biting insect attracting apparatus. The propane tank is connected to a burner that, in operation, produces combustion. The burning propane produced by the flame is the source of the $CO_2$. If desired, the propane tank may be mounted in a recess in the mosquito and biting insect attracting apparatus. Alternatively, the propane tank may be mounted under or beside the mosquito and biting insect attracting apparatus, and the apparatus may include removable or foldable legs for support. Removing or folding the legs compacts the mosquito and biting insect attracting apparatus for easier transport.

The thermal lure includes a structure that surrounds the burner and that is heated by the burner to a temperature that is similar to that of a small animal, such as 95 to 115 degrees Fahrenheit. The structure includes a series of baffles and conduction elements that permit the structure to have a substantially constant heat signature, which is desirable for attracting mosquitoes and other biting insects.

In accordance with one aspect of the present invention, the thermal lure includes three concentric cylinders, each made of aluminum or another highly thermally conductive material. The innermost cylinder surrounds the flame of the burner, and heat is transferred to the outermost cylinder from the innermost cylinder by thermally-conductive connector arms. In accordance with a further aspect of the present invention, the connector arms extend to the bottom of the outer cylinder, so that heat may rise to the top of the outer cylinder and the outer surface of the outer cylinder maintains a substantially constant temperature.

The central cylinder and the baffles work together to dissipate the heat of the exhaust of the flame, by moving some of the exhaust sideways out of the thermal lure, so that not all exhaust exits the same location, thus avoiding a hot spot in the thermal lure. In addition, the baffles and central cylinder help to mix the exhaust with ambient air, increasing heat dissipation and further reducing the possibility of a hot spot being formed on the outermost cylinder by the exhaust or convection.

An adjustment mechanism may be provided to adjust the height of the flame. In this manner, the flame height may be adjusted to account for ambient temperature, or to provide a thermal footprint that is appropriate for a location or weather condition. If desired, settings may be provided for particular weather conditions, such as temperatures, so that a user may set the flame to the appropriate level for a given weather condition.

The source of the chemical biting insect attractor may be, for example, a strip of octenol. In accordance with one aspect of the present invention, an octenol strip is mounted in a holder on the side of the thermal lure, whereby the heat of the thermal lure may be used to activate the octenol in the strip. If desired, the octenol strip may be provided in a disposable container, such as a tray, so that it may be easily replaced when the octenol is evaporated.

The trapping or killing mechanism may be sticky adhesive, provided, for example, on one or two trays that are situated around the thermal lure. In accordance with one aspect of the present invention, the adhesive may be provided to a consumer on a pair of trays. Each of the trays includes a pair of fold lines so that the trays may be folded into trifold, half-hexagon shapes. A backing is removed from the adhesive material, and the two halves are placed on opposite sides of the thermal lure with the adhesive facing outward. The trays may include guides along their outer edges that fit onto rails within the mosquito and biting insect attracting apparatus, providing easy removal of a tray filled with biting insects and easy replacement of a new tray.

Preferably, the mosquito and biting insect attracting apparatus requires a minimal flame for operation. In this manner, a small propane fuel tank, such as the 16.4 ounce COLEMAN propane fuel tank manufactured and supplied by The Coleman Company, Inc., the assignee of the present invention, may provide enough fuel for the mosquito and biting insect attracting apparatus to operate for approximately 50 hours, which is equal to running the device approximately 3 hours per night (prime mosquito time) for 2 weeks. A 20 pound bottle of propane may be connected to the mosquito and biting insect attracting apparatus to allow operation for over 1000 hours. If desired, the octenol strip may be sized and arranged so that the octenol on the trays evaporates in approximately the same amount of time as normal use of the small propane tank over two weeks. Thus, maintenance of the mosquito and biting insect attracting apparatus would require only that the tank be replaced or refilled, and that the octenol tray be replaced once every two weeks. Occasional replacement of the adhesive trays may also be needed, especially where the trays are full of mosquitoes or other biting insects, or when the trays become dirty.

A removable or hinged top may be provided on the top of the mosquito and biting insect attracting apparatus for accessing the octenol tray and the adhesive trays. In this manner, easy access may be had to the trays for maintenance or replacement. In addition, the top provides some protection for the adhesive trays from dirt and other foreign matter.

Other advantages will become apparent from the following detailed description when taken in conjunction with the drawings, in which:

BRIEF DESCRIPTION OF THE DRAWINGS

FIG. 9A is a top view of one embodiment of a sticky tray that may be used in a sticky frame assembly for use in the mosquito and biting insect attracting apparatus of FIG. 1 or 2, the view showing the sticky tray in a flat, shipping configuration in phantom;

FIG. 9B is a perspective view of an alternate embodiment of a sticky tray that may be used in a sticky frame assembly for use in the mosquito and biting insect attracting apparatus of FIG. 1 or 2;

FIG. 10 is a sticky frame assembly in accordance with one aspect of the present invention that may be used with the mosquito and biting insect attracting apparatus of FIG. 1 or 2;

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "back," and the like, the orientations are to aid the reader in understanding the invention, and are not meant to be limiting.

At the outset, it is important to note a few characteristics of mosquitoes and flying insects. Typically, biting insects are attracted by the odor of kairomones, which are chemicals given off by blood hosts and which are attractants to biting insects. Kairomones include carbon dioxide exhaled by both mammalian and avian blood hosts and octenol, an alcohol which is given off by mammalian blood hosts. Biting insects locate a blood host by tracking the carbon dioxide plume created by the blood host. A mixture of carbon dioxide and octenol is particularly attractive to insects seeking mammalian blood hosts.

As a biting insect approaches a blood host, it is attracted to the heat that is emanated by the blood host. Mosquitoes and biting insects respond to a narrow range of temperature, typically about approximately 95 to 115 degrees Fahrenheit. The inventors' research has indicated that, in order to attract the biting insects, an item must have a fairly constant temperature over its surface, and preferably must not have temperatures on its surface that are above or below this range. If there are lower or higher temperatures, the biting insects are usually repelled.

Figure 1:
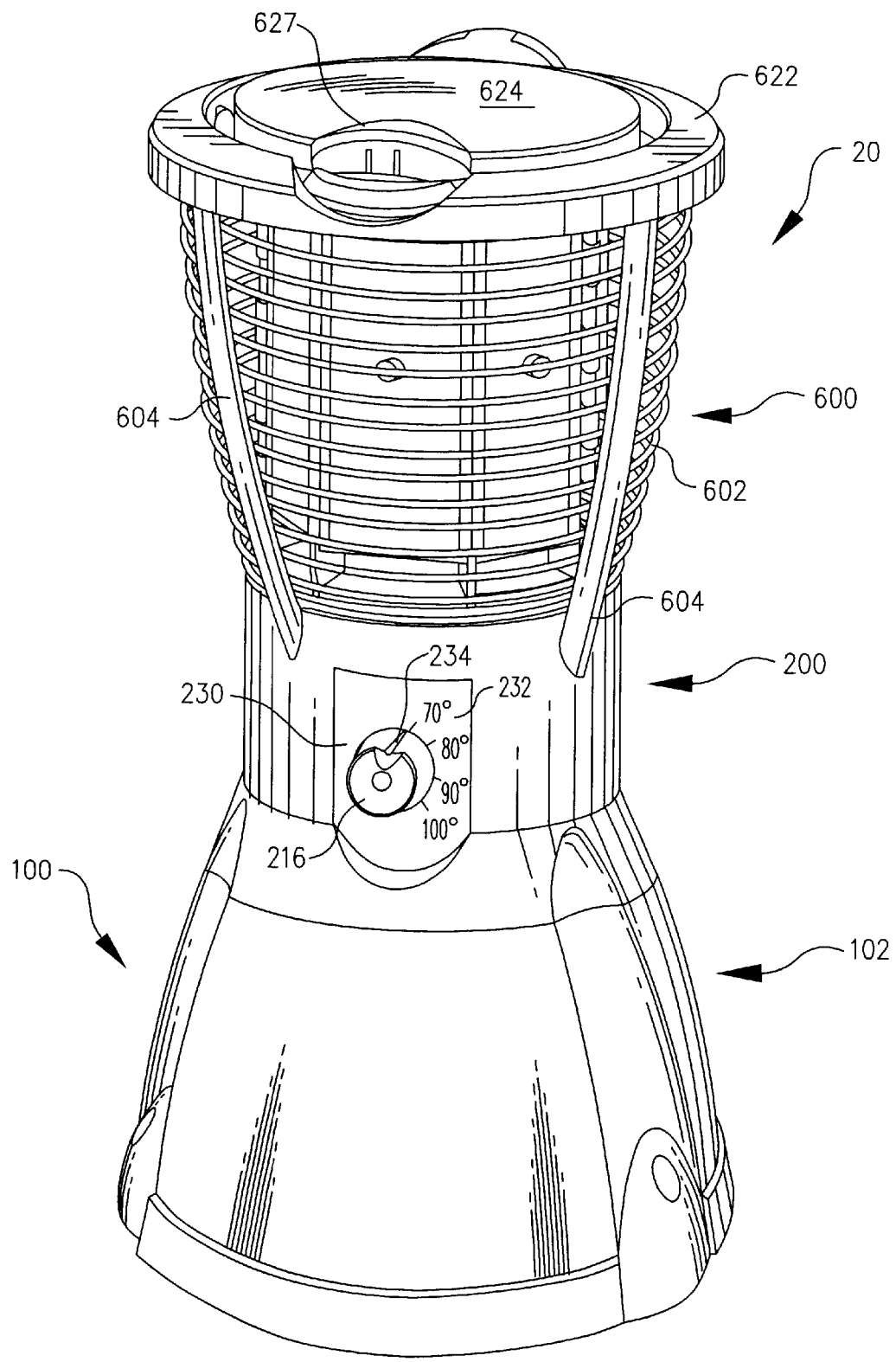
FIG. 1 is a perspective view of one embodiment of a mosquito and biting insect attracting apparatus incorporating the present invention, the apparatus including a skirt as a base into which a propane tank may be mounted.
Figure 2:
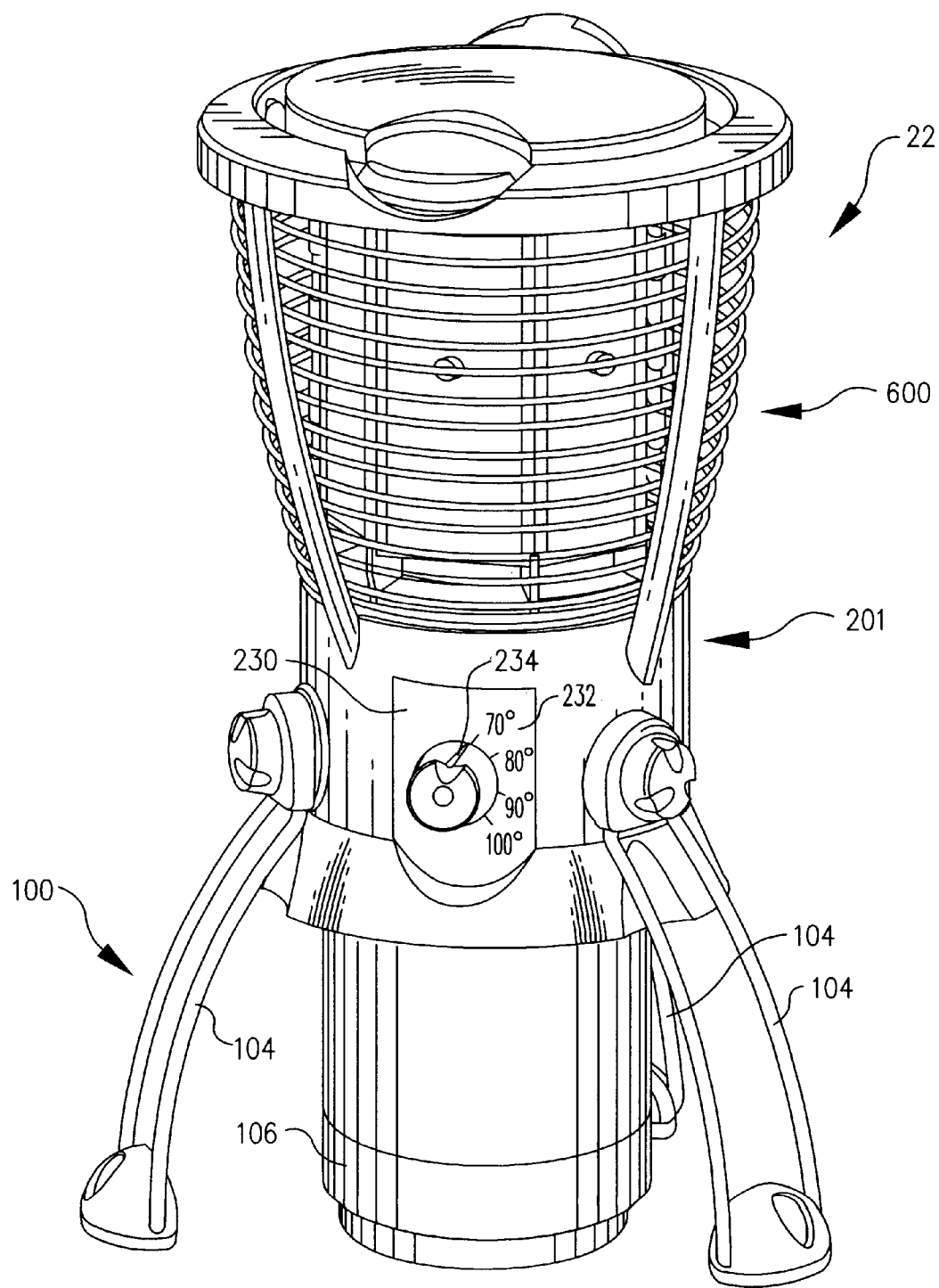
FIG. 2 is a perspective view of an alternate embodiment of a mosquito and biting insect attracting apparatus incorporating the present invention, the alternate embodiment including removable or foldable legs.
Figure 3:
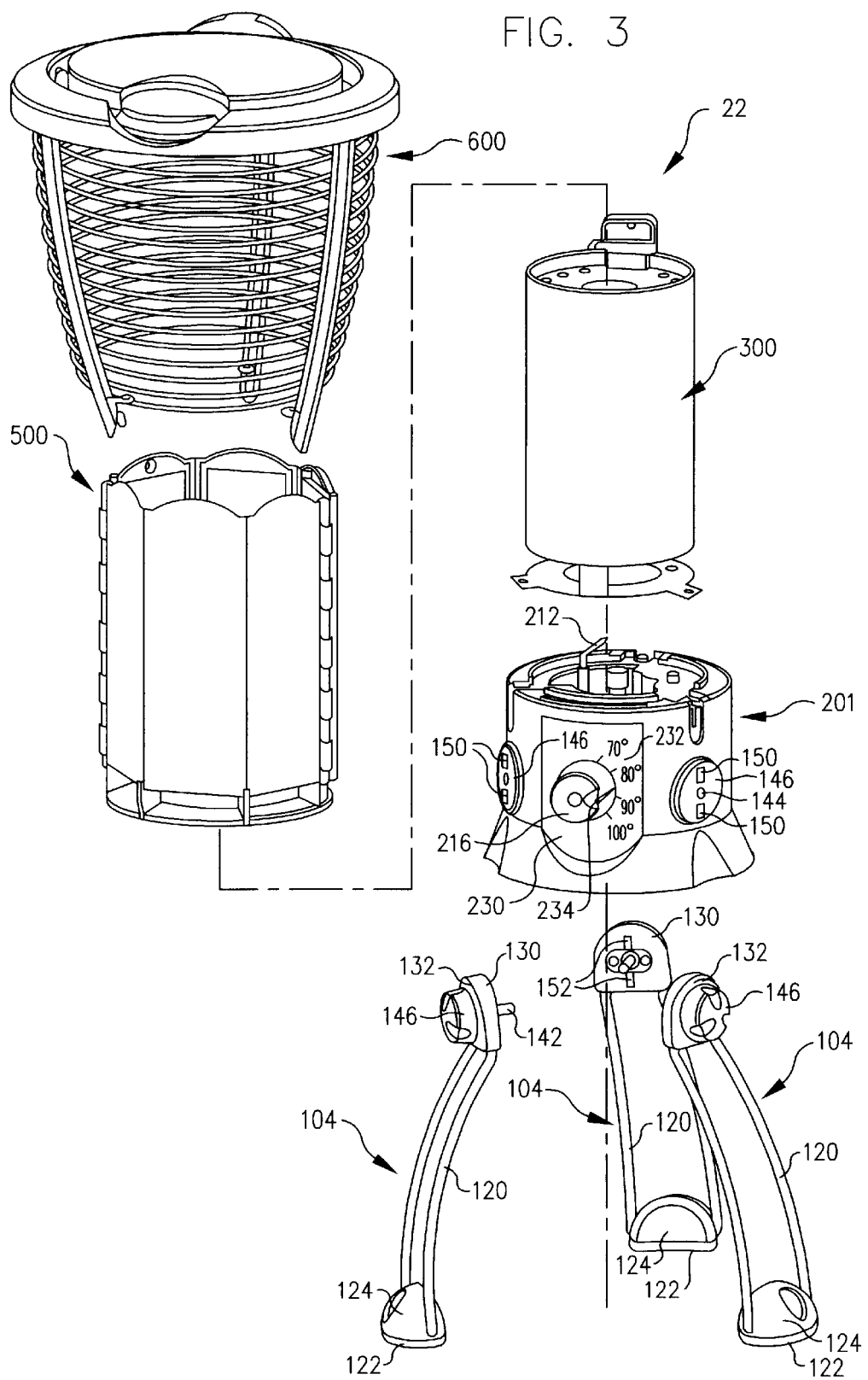
FIG. 3 is an exploded perspective view of the mosquito and biting insect attracting apparatus of FIG. 2.
Figure 4:
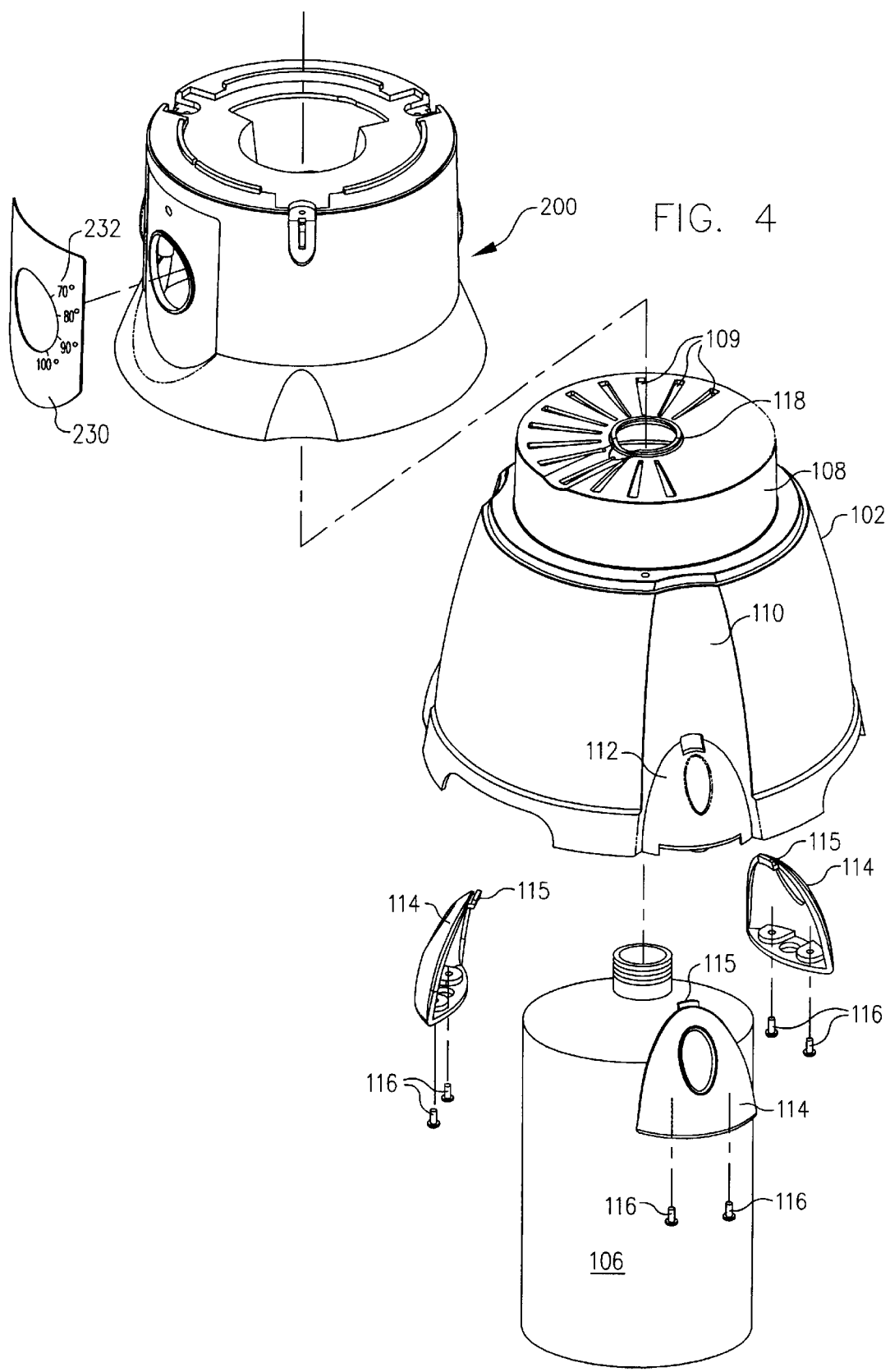
FIG. 4 is an exploded perspective view of the skirt and a waist assembly for the mosquito and biting insect attracting apparatus of FIG. 1.

Referring to FIG. 1 of the drawings, there is shown a mosquito and biting insect attracting apparatus designated generally by reference numeral 20. An alternate embodiment is shown in FIG. 2, and is designated generally by the reference numeral 22. Briefly described, the mosquito and biting insect attracting apparatus 20 includes a base 100, shown in the form of a skirt 102 in FIG. 1, and legs 104 in FIG. 2. The mosquito and biting insect attracting apparatus 20 includes a waist assembly 200 (FIG. 4) configured for fitting over the skirt 102, and the mosquito and biting insect attracting apparatus 22 includes a waist assembly 201 (FIG. 3) that is configured for attachment of the legs 104. Other than these differences, the two embodiments of the mosquito and biting insect attracting apparatus 20, 22 include essentially the same components. To this end, FIG. 3 shows an exploded perspective view of the mosquito attracting apparatus 22, and the components above the waist assembly 201 are included in both the mosquito and biting insect attracting apparatus 20 and 22. The exploded perspective view of the waist assembly 200 and the skirt 102 for the mosquito and biting insect attracting apparatus 20 is shown in FIG. 4. For ease of description, when discussing the components of the mosquito and biting insect attracting apparatus 20 or 22 that are common to the two, the components will be described with reference to the mosquito and biting insect attracting apparatus 20.

Figure 6:
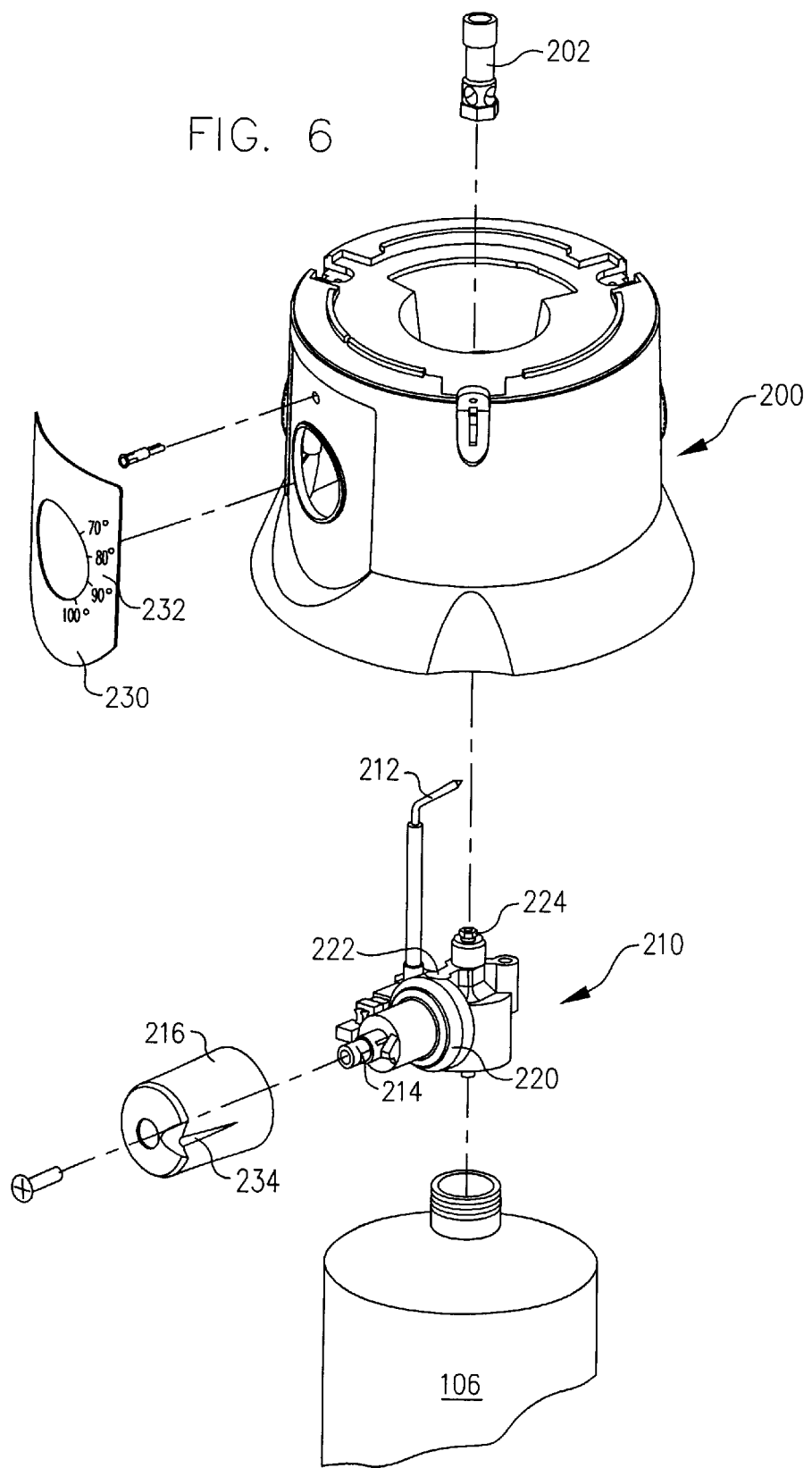
FIG. 6 is an exploded perspective view of a waist assembly for the mosquito and biting insect attracting apparatus of FIG. 1.

Continuing with a general description of components that are common to the mosquito and biting insect attracting apparatuses 20 and 22, the waist assembly 200 or 201 houses a burner tube 202 (e.g., FIG. 6). A thermal lure 300 (e.g., FIG. 3) is seated on top of the waist assembly 200 or 201 and, during operation, is heated by combustion in the burner tube 202 to create a heat pattern that simulates a small mammal or bird. A source of a chemical biting insect attractant, such as an octenol strip 400 (e.g., FIG. 7). In operation, the burner tube 202 creates combustion that serves as a source of carbon dioxide ($CO_2$). Together, the carbon dioxide provided by the burner, the chemical biting insect attractant, and the thermal lure emulate a small mammal or bird, thus attracting mosquitoes and other biting insects. A mechanism may be provided for trapping or killing the attracted mosquitoes, such as a sticky adhesive or an electronic grid. For example, a sticky adhesive assembly 500 (e.g., FIG. 10) may be provided that includes adhesive trays 502 for trapping mosquitoes and biting insects. The sticky adhesive assembly 500 may be mounted, for example, in a top assembly 600 (e.g., FIG. 11) of the mosquito and biting insect attracting apparatus 20, and around the thermal lure 300, as further described below.

The base 100 may be of any suitably design, but preferably is designed to support the mosquito and biting insect attracting apparatus 20 in an upright position, and is configured so that it may receive a small propane tank 106 (FIGS. 2 and 4). The small propane tank 106 may be, for example, a COLEMAN 16.4 ounce propane tank, such as can be purchased for use with COLEMAN brand lanterns, both of which are manufactured by the assignee of the present invention, The Coleman Company, Inc. The COLEMAN propane tank is readily available at many retail stores that carry camping goods and/or sporting goods.

As can best be seen in FIG. 4, the skirt 102 for the mosquito and biting insect attracting apparatus 20 is generally frustoconical in shape, having a waist base 108 at its top for attachment of the waist assembly 200. The waist base 108 includes a series of slots 109 therein, which permit cooling of the propane tank 106, and airflow into the waist assembly 200 to supply air to the burner tube 202. The embodiment of the skirt 102 shown in the drawings includes three convex indentations 110 (only one of which is shown in FIG. 4) spaced equally around the skirt. A concave protrusion 112 is located at the bottom of each of the convex indentations 110, over which is fitted a skirt foot 114. The skirt foot 114 may include a tab 115 and fastener 116 attachment, such as is shown in the drawings, or may be attached in another suitable manner. Alternatively, if desirable, the skirt feet 114 may be formed integrally with the skirt 102. The skirt 102 and the skirt feet 114 may be formed of cast aluminum, steel, plastic, or another suitable material. In use, the mosquito and biting insect attracting apparatus 20 rests on the skirt feet 114, and the skirt feet support the mosquito and biting insect attracting apparatus 20.

An opening 118 extends through the top center of the skirt 102. The opening 118 is arranged and configured to receive the upper neck of the small propane tank 106. The remainder of the small propane tank 106 fits within the skirt 102, and the bottom of the small propane tank may, for example, be spaced above the surface on which the skirt is sitting.

Figure 5:
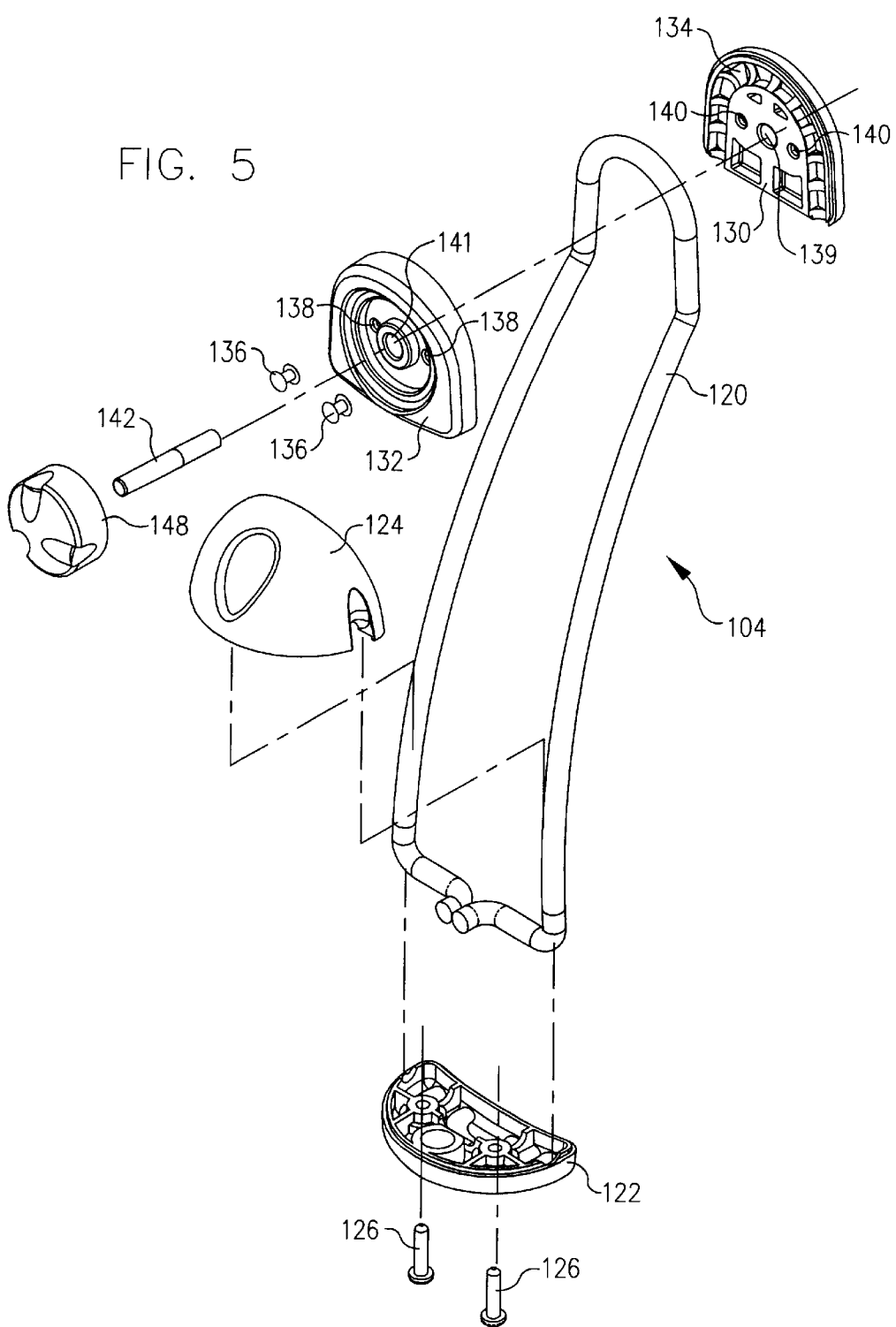
FIG. 5 is an exploded perspective view of the legs for the mosquito and biting insect attracting apparatus of FIG. 2.

Turning now to FIG. 5, the legs 104 include a leg wire 120, formed, for example, of ¼ inch steel wire, and shaped to extend downward and outward from the waist assembly 200, and bent into a loop. The ends of the loop may be connected in a suitable manner, such as by welding. A lower foot piece 122 fits under the leg wire 120, and an upper foot piece 124 fits over the lower foot piece, and on the opposite, inside side of the leg wire 120. The lower foot piece 122 and the upper foot piece 124 are connected in a suitable manner, such as by fasteners 126. The lower foot piece 122 and the upper foot piece 124 may be formed of a suitable material such as plastic or a metal.

An inner leg hub 130 and an outer leg hub 132 are attached on opposite, upper sides of the leg wire. The inner and outer leg hubs 130, 132 preferably include some form of structure to prevent rotation of the hubs relative to the leg wire 120, such as a groove 134 in the inner leg hub 130. The inner and outer leg hubs 130, 132 are attached, for example by rivets 136. The inner and outer leg hubs 130, 132 include holes 138, 140 therethough for receiving the fasteners. Central holes 139, 141 extend through the middle of the inner and outer leg hubs 130, 132.

A shaft 142 is fitted into a hole 144 (FIG. 3) in a leg mount 146 (also shown in FIG. 3) on the waist assembly 201 for the mosquito and biting insect attracting apparatus 22. The shaft 142 includes a protrusion at its distal end, onto which a knob 148 may be press fit or removably attached in another suitable manner (e.g., threaded onto).

The removable attachment of the knob 148 on the shaft 142 permits the legs 104 to be removably attached to the waist assembly 200. To attach the legs 104, the holes 139, 141 on the inner and outer leg hubs 130, 132 are placed over the shaft 142, and the knob 148 is tightened on (e.g., pressed onto) the shaft 142. If desired, protrusions 150 (FIG. 3) may be provided on the leg mount 146 for fitting into recesses 152 (FIG. 3) on the back of the inner leg hubs 130. The protrusions 150 assure that the legs 104 do not rotate after attachment. In use, the mosquito and biting insect attracting apparatus 22 rests on the lower foot piece 122 and is supported by the legs 104. In addition, the small propane tank 106 rests on or above the surface (e.g., the ground or a table) on which the feet 104 are resting.

If desired, the knob 148 and the legs 104 may be configured so that loosening the knob permits the legs to be rotated. In this manner, the knob 148 may be loosened, and the legs may be rotated to extend upward along the sides of the top assembly 600. This feature permits the mosquito and biting insect attracting apparatus 22 to be compactly stored, yet does not require a user to separately store the legs 104.

The waist assembly 200 is shown in detail in FIG. 6. For the most part, the waist assembly 200 for the mosquito and biting insect attracting apparatus 20 is essentially the same as the waist assembly for the mosquito and biting insect attracting apparatus 22, with the exception of the attachment of skirt 102 verses the attachment of the legs 104. For the mosquito and biting insect attracting apparatus 22 that includes the legs 104, a waist bracket (not shown) is provided that attaches to the bottom of the waist assembly 200, and includes holes therein for allowing air into the burner tube 202 and a hole for receiving the top of the small propane tank 106. The holes 109, 118 in, and the top of, the waist base 108 for the mosquito and biting insect attracting apparatus 20 that uses the skirt 102 serve a similar function and are similarly structured. For the waist assembly 200 that fits over the skirt 102, a recess (not shown) is provided on the bottom of the waist assembly 200 for fitting over the waist base 108. The waist assembly 200 may be attached in a suitable manner, such as by fasteners, or may simply rest on top of the skirt 102. The waist assembly 201 that attaches to the legs 104 includes the leg mounts 146, the function of which has already been described.

For the mosquito and biting insect attracting apparatus 20 shown in FIG. 1, the small propane tank 106 fits into the skirt 102 and the threaded mouth of the small propane tank 106 extends partly into the waist assembly 200. For the mosquito and biting insect attracting apparatus 20, the small propane tank 106 fits between the legs 104 and the small propane tank 106 rests on or above the surface upon which the legs are resting. Again, the threaded mouth of the small propane tank 106 extends partly into the waist assembly 200.

A regulator 210 (FIG. 6) fits within the waist assembly 200. The regulator 210 includes female threads (not shown) for fitting onto the treaded top of the small propane tank 106. The regulator 210 is designed in a manner known in the art to control the amount of propane supplied to the burner tube 202. An electric igniter 212 is attached to the side of the regulator 210. An adjustment shaft 214 extends out of the front of the regulator 210. A control knob 216 is attached to the end of the adjustment shaft 214.

Although the function, structure and operation of the regulator 210 are generally known, a general description is given here for the convenience of the reader. To start combustion in the burner tube 202, when the control knob 216 is located in an "off" position, the control knob is rotated, in this case in a counterclockwise direction, causing the adjustment shaft 214 to rotate. Rotation of the adjustment shaft 214 causes two things to happen. First, the rotation of the adjustment shaft 214 opens a valve (not shown), permitting the release of propane from the small propane tank 106, through a gas tip 224, and into the burner tube 202, which is attached to the top of the gas tip 224. Second, rotation of the adjustment shaft 214 from the "off" position causes the electric igniter 212 to spark. The spark ignites the propane in the burner tube 202, causing combustion. Turning the control knob 216 further counterclockwise opens the valve even more, and increases the amount of propane supplied by the small propane tank 106, thus increasing the size of the flame in the burner tube 202. Likewise, clockwise rotation of the control knob 216 while there is a flame in the burner tube 202 decreases the size of the flame.

As an alternative to the propane burner described, other forms of combustion may be used, including those which do not produce a flame, for example a catalytic burner. The fuel does not have to be propane, and may, as nonlimiting examples, be butane, natural gas, or liquid propane.

A plate 230 is mounted on the surface of the waist assembly 200, and around the control knob 216. The plate 230 includes indicia 232 along the periphery of the opening that receives the control knob 216. In the disclosed embodiment, the indicia 232 are 70 degrees, 80 degrees, 90 degrees, and 100 degrees, respectively. The control knob 216 includes an indicator 234 that may be aligned with one of the indicia 232. The function of the indicia 232 and the indicator 234 are described further below.

Figure 7:
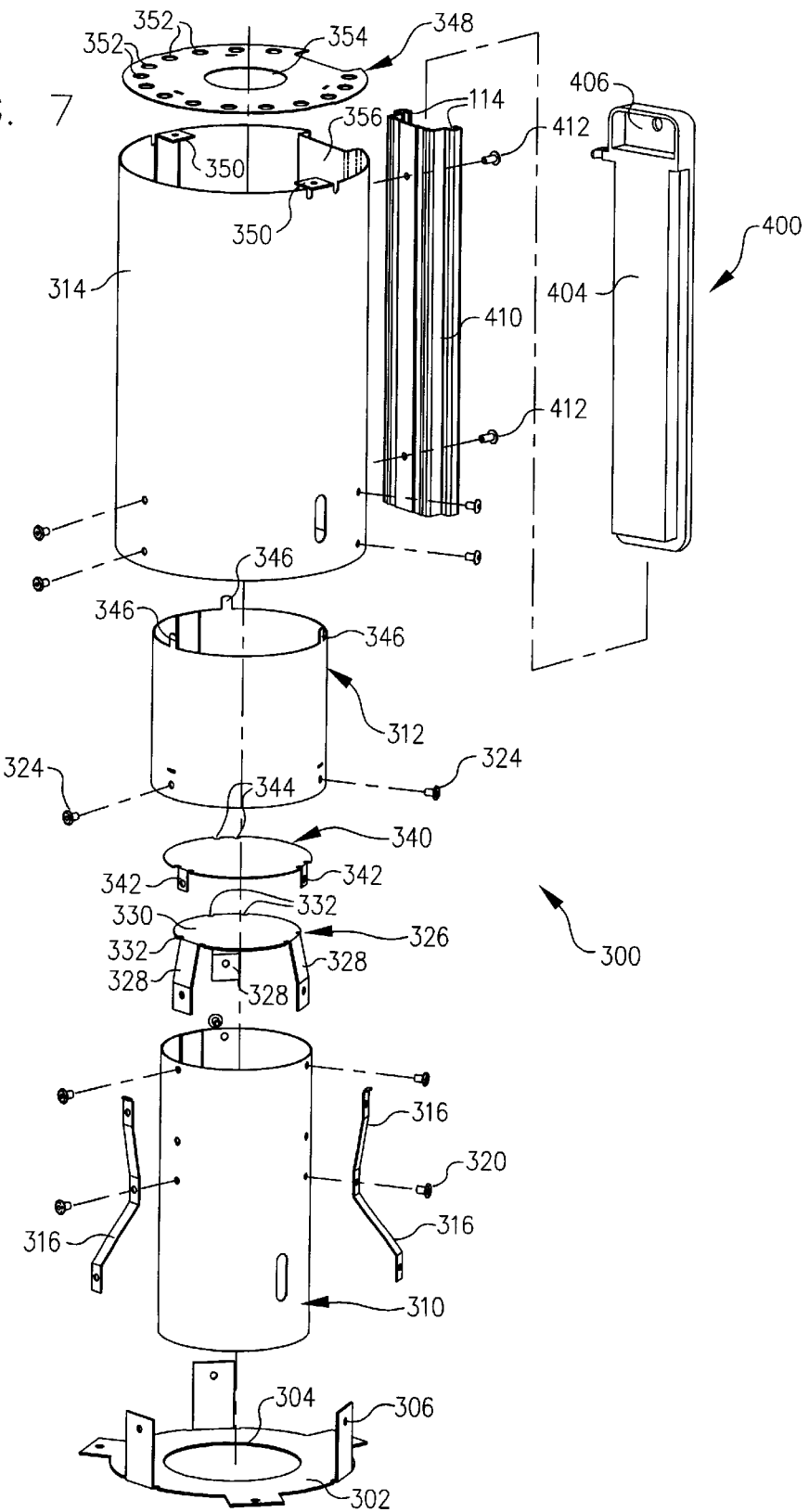
FIG. 7 is an exploded perspective view of a thermal lure assembly that may be incorporated in the mosquito and biting insect attracting apparatus of FIG. 1 or 2.

An exploded view of the thermal lure 300 is shown in FIG. 7. The thermal lure 300 includes a structure that surrounds the burner and that is heated by the burner. The thermal lure 300 is designed and configured so that radiant, conductive, and reflective heat are channeled throughout it so that the outside temperature is substantially constant. When the flame in the burner is adjusted an appropriate amount, the substantially constant temperature may be similar to that of a small animal, such as 95 to 115 degrees Fahrenheit.

To aid in heat dissipation, the thermal lure includes a series of baffles, shields and thermal conduction elements that permit the structure to have a substantially constant heat signature on the outside surface. These elements are shown in detail in FIG. 7. Beginning at the bottom, the thermal lure 300 includes a base 302 having an opening 304 through its center. When the mosquito and biting insect attracting apparatus 20 or 22 is assembled, the base 302 fits on top of the waist assembly 200 or 201, as can be seen in FIG. 3. The base includes three tabs 306 that bend upward perpendicular to the rest of the base.

Figure 8:
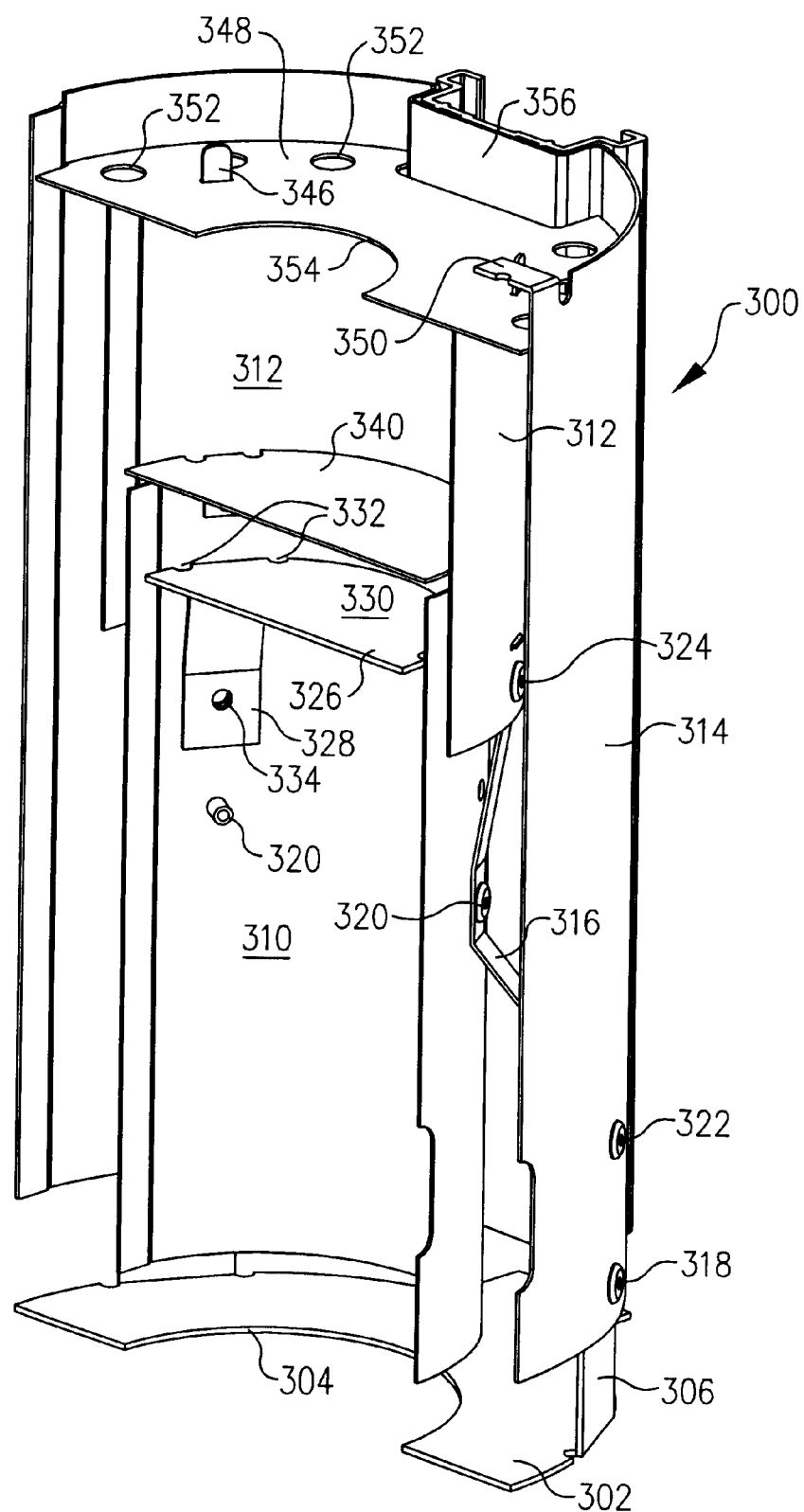
FIG. 8 is an assembled, cutaway view of the thermal lure assembly of FIG. 7.

The thermal lure 300 includes three concentric cylinders 310, 312, 314, each made of aluminum or another highly thermally conductive material. The cylinders shown have circular cross-sections, but their cross sections may take any shape, including but not limited, regular polygons. The innermost cylinder 310 surrounds the flame of the burner tube 202. The central cylinder 312, which serves as a shield, is slightly larger in diameter than the inner cylinder 310, and is mounted so that it slightly overlaps the top of the inner cylinder, and extends upward therefrom (see FIG. 8). The outer cylinder 314 extends around the inner and central cylinders 310, 312, and is attached at its lower end to the tabs 306 on the base 302, for example by rivets 318 (FIG. 8). A space is defined between the lower end of the outer cylinder 314 and the bottom of the base.

Three connector arms 316 connect the three cylinders 310, 312, 314. The connector arms 316 are attached at the centers, for example by rivets 320, to the inner cylinder 310. A lower part of the connector arms 316 bends outward and downward to connect to the outer cylinder 314, for example by rivets 322. The upper portion of the connector arms 316 extends outward and upward to connect to the bottom of the central cylinder 312, for example by rivets 324.

A baffle 326 is mounted in the top portion of the inner cylinder 310. The baffle 326 includes three downwardly protruding legs 328 and an upper, circular-shaped top 330 that is shaped similar to the inside of the inner cylinder 310. A series of air flow holes 332 are spaced around the periphery of the top 330. The legs 328 of the baffle 326 are attached to the inner surface of the inner cylinder 310, such as by welding or rivets 334. When the baffle 326 is attached to the inner cylinder, there is a small gap between the edges of the top 330 and the inner surface of the inner cylinder 310.

A circular inner roof 340 is fitted over the top of the inner cylinder 310. The circular inner roof includes downwardly-extending legs 342 for attachment to the inner surface of the inner cylinder 310, such as by welding or rivets. As with the top 330 of the baffle 326, a series of air flow holes 344 are spaced around the periphery of the circular inner roof 340. The circular inner roof 340 is mounted so that there is a small gap between the bottom, outer edges of the circular inner roof and the top edges of the inner cylinder 310.

The central cylinder 312 includes three upwardly-extending tabs 346 that fit into a cap 348. The cap 348 includes a series of holes 352 spaced inward from its perimeter and around its periphery. A central hole 354 is located in the center of the cap 348. When installed, the cap 348 is spaced below the top of the outer cylinder 314, and slightly inward from the sides of the outer cylinder.

The outer cylinder 314 includes a pair of inwardly-extending tabs 350 at its upper end. An elongate indentation 356 extends along one side of the outer cylinder 314.

When a flame is burning in the burner tube 202, the flame is located within the inner cylinder 310. The flame emits heat in the form of radiation and hot exhaust gases. The radiant heat is mostly absorbed by the inner cylinder 310 and the baffle 326. The heat in the baffle 326 is transferred downwardly, via conduction through the arms 328, to the inner cylinder 310. Thus, the radiant heat mostly is transferred to the inner cylinder 310. Some of this radiant heat is transferred upwardly, via the connector arms 316, to the central cylinder 312. More of the heat is transferred to the outermost cylinder 314 from the inner cylinder 310 by the thermally-conductive connector arms 316. In accordance with an aspect of the present invention, the connector arms 316 extend to the bottom of the outer cylinder 314, so that heat may rise to the top of the outer cylinder and the outer surface of the outer cylinder maintains a substantially constant temperature.

The central cylinder 312, the baffle 326, and the inner roof 340 work together to dissipate the exhaust of the flame, by moving some of the exhaust sideways out of the thermal lure and mixing it with ambient air. Ambient air enters the thermal lure 300 via the holes 352 in the cap 348, through the gaps between the base 302 and the inner and outer cylinders 310, 314. The baffle 326 cools exhaust by forcing it sideways. The heat of the exhaust is partially absorbed by the baffle 326, and partly by the inner cylinder 310. The movement of the exhaust also makes it mix with ambient air, which cools the exhaust. The exhaust that escapes around the edges of the baffle 326 flows into the area between the inner roof 340 and the baffle, where more of the heat is absorbed by the inner roof, the baffle, and the inner cylinder 310, and further mixing with ambient air occurs. The heat in these elements is partly dissipated by the size of the inner cylinder 310 and its contact with ambient air, and partly by conduction via the conductive arms 316.

Exhaust that flows around the perimeter of the inner roof 340 flows into the central cylinder. Some of the heat of that exhaust is dissipated in the central cylinder, and some in the cap 348. Further mixing with ambient air occurs. The exhaust then has one exit upward-the central hole 354 in the cap 348. The heat of the cap 348 flow partly into the central cylinder via conduction through contact, and is partly dissipated by contact with ambient air. The heat in the central cylinder is dissipated mostly by ambient air.

The outer cylinder 314 is heated by conduction through the conductive arms 316 and by any heated air/exhaust that flows from the inner and central cylinders 310, 312. The conductive arms 316 transfer heat to the bottom of the outer cylinder 314, where it may naturally travel upward, creating a uniform heat pattern on the outside of the outer cylinder 314. Because all exhaust and heated air does not exit the same location, a hot spot is avoided for the thermal lure 300. In addition, the baffle 326, the inner roof 340, the cap 348, and the central cylinder 312, because they do not contact the outer cylinder 314, may dissipate some of the heat through convection and contact with ambient air. These elements also help to mix the exhaust with ambient air, increasing heat dissipation and further reducing the possibility of a hot spot being formed on the outer cylinder 314.

Although in the embodiment shown the flame is located within the thermal lure 300, the flame may be located below or near the thermal lure. However, if not located in the thermal lure, it is important that the flame be shielded so that it does not create a hot spot for the mosquito and biting insect attracting apparatus 20. Thus, if the flame is adjacent to the thermal lure 300 (i.e., located so that the flame can heat the thermal lure), appropriate shielding or insulation should be used to avoid the flame creating a hot spot.

It can be understood that only a small flame is needed to maintain the thermal lure 300 between 95 and 115 degrees. In fact, for the embodiment shown, during operation, the flame in the burner tube preferably burns between 300 and 400 BTU's per hour when operated at 70 degrees Fahrenheit, and more preferably burns 345 to 355 BTU's per hour at that temperature. Thus, the regulator 210 is preferably designed so that it may emit a very small, continuous stream of propane from the small propane tank 106.

Figure 13:
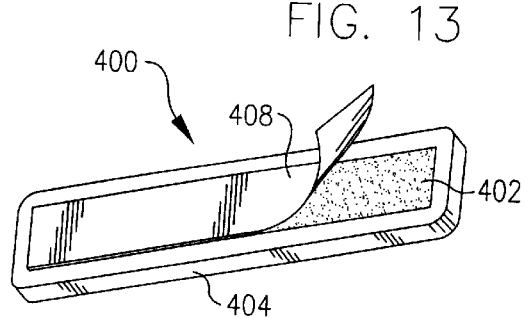
FIG. 13 is a top, view of an octenol strip that may be used with the present invention.

The octenol strip 400 is shown in FIGS. 7 and 13. In general, the octenol strip 400 may supply any insect attracting chemical, but in a preferred embodiment supplies octenol. The octenol strip 400 shown in FIG. 13 is supplied with an octenol chemical solution 402 in a tray 404 having a handle 406 (FIG. 7), in the form of an indentation on the rear of the tray, at one end. The octenol strip 400 is supplied with a foil cover 408 that seals the octenol chemical solution during shipping and storage. The foil cover 408 is shown in a partial stage of removal in FIG. 13.

A holder, in the drawing shown as a track 410 (FIG. 7), is provided for mounting the octenol strip 400 on the side of the thermal lure 300. The track 410 is mounted on the outer surface of the outer cylinder 314 for the thermal lure 300, for example by rivets 412. The tract 410 includes grooves 414 along each side for receiving the edges of the octenol tray 404. When installed, the octenol strip 400 extends in the track 410 and is held by the grooves 414 on the sides of the track 410. The bottom of the octenol strip 400 rests on the top of the waist assembly 200, or may be supported by a protrusion (not shown) or other surface in the bottom of the track 410.

The octenol chemical solution 402 is formulated so that it slowly releases octenol as a result of exposure to air. Heat increases the release of octenol from the octenol chemical solution 402, such as heat supplied by the thermal lure 300. In accordance with one aspect of the present invention, there is enough octenol in the octenol chemical solution 402, and the release is at such a rate, that it takes at least 2 weeks to evaporate under the operating temperature of the thermal lure 300. The octenol chemical solution 402 may be, for example, one of many existing octenol lures produced by BioSensory Insect Control Corporation of Willimantic, Conn., such as is described in BioSensory's U.S. Pat. No. 5,799,436, incorporated herein by reference. BioSensory's octenol is dissolved in a wax matrix. The wax matrix allows the octenol release to be a function of temperature—not humidity. The octenol track may be, for example, 0.4 inch thick, 1.5 inch wide and 7.25 inch long. A flange $3/16$ inch wide (included in the 1.5 inch width) and $1/10$ inch thick on each side engages the grooves 414 in the track 410. The octenol chemical solution 402 fills the recess formed in the tray. Other formulations and volumes of the octenol chemical solution 402 may be used.

In use, a user removes the foil cover 408 from the tray 402, and inserts the octenol strip 400 into the track 410. The octenol in the octenol chemical solution 402 immediately begins evaporating, but at a slow rate. The octenol evaporates at a higher rate when the thermal lure 300 is at operating temperature, but preferably lasts a time which is roughly equivalent to the time for the propane in the small propane tank to be used, for example, two weeks.

The sticky adhesive assembly 500 is shown in detail in FIG. 10. In the embodiment shown, a base ring 504 is provided that includes a number (in the embodiment shown, eight) of tray mounts 506 thereon. The tray mounts 506 each extend perpendicularly upward from the base ring 504, and include notches 507 at their outer, distal edges. A pair of tray supports 508 are attached on opposite sides of the base ring 504, and extend perpendicularly thereto. Each tray support 508 includes a pair of rails 509, one each of which extends along an opposite side of the support. The tray rails 508 are attached in a suitable manner to the base ring 504, for example by inserting a bottom flange 510 that extends into a slot 512 in the base ring 504, and may be attached by welding or by press-fitting. The base ring 504 is attached to the top of the waist assembly 200, for example by fasteners or welding.

Turning now to FIG. 9A, the adhesive trays 502 shown in that drawing is generally rectangular-shaped, and each include two creases 514 extending along their height. The adhesive trays 502 may be formed, for example, of plastic or another suitable material. The creases 514 divide the trays 502 into three panels 516, each of which includes a shallow indentation 518 for receiving an adhesive substance 520. A protrusion 522 extends through the center of each of the shallow indentations 518 for helping to hold adhesive substance 520 in the indentation 518. The top edges of each of the panels 516 includes a handle 524 (FIG. 10), in the form of a recessed indentation.

The side edges of the adhesive trays 502 include guides 530. The guides 530 in the shown embodiment are offset concave flanges that extend the length of the edges of the adhesive trays 502, and the concave portions of which face one another.

The adhesive trays 502 are preferably supplied with a quantity of adhesive (the adhesive substance 520) in each of the shallow indentations 512. The adhesive substance 520 may be, for example, mixtures of gum, rubber and mineral oil, polybutenes, mixtures of wax and resins, an unhardened glue, a sticky rosin material, fly paper, plastic containing large amounts of plasticizer, or similar sticky materials. Preferably, the adhesive on the adhesive trays 502 maintains its stickiness at the operating temperatures of the mosquito and biting insect attracting apparatus 20, for example, at 95 to 115 degrees Fahrenheit. In addition, the adhesive should not flow at the operating temperatures, lest the adhesive would run off of the adhesive trays 502 during operation. The adhesive should have sufficient tack so that a bug lighting on the adhesive would stick and could not fly away. Also, the adhesive should be able to withstand weather conditions, such as cold, rain, or wind.

In accordance with one aspect of the present invention, the adhesive substance 520 is a mixture of paraffin oil, hydrocarbon resin, and styrene polymer. However, as described above, several other formulations may be used.

In use, a backing (not shown, but known in the art) is removed from the adhesive substance 520 on the adhesive trays 502, and the trays are folded along the creases 510 into trifold, half-hexagon shapes. The two halves are aligned on opposite sides of the thermal lure with the adhesive substance 520 facing outward (FIG. 10), and are installed on the sticky adhesive assembly 500 by aligning the guides 520 on the adhesive trays 502 with the rails 509 by placing the first opposing concave guides on each edge of the adhesive tray on one side of the of the tray rails 508 and sliding the sliding the adhesive trays 502 onto the rails so that the opposing guides pass on alternate sides of the rails, and are centered against the sides of the rails and hold the adhesive tray in place. The bottoms of the adhesive trays 502 rest against the notches 507 on the tray mounts 506.

Other configurations may be used for the guides, such as flanges that extend down the length of both of the sides of the adhesive tray, or small flanges at opposite ends of the trays. Any structure that maintains the adhesive trays 402 in position adjacent to the thermal lure 300 may be used.

An alternative embodiment of an adhesive tray 540 is shown in FIG. 9B. For that embodiment, the overall shape of the tray is virtually the same, including the guides 542 and the handles 544, but the adhesive material 546 in this embodiment is a single sheet of a tacky material, and extends through the crease lines. In this manner, greater coverage of adhesive is provided on the outside surface of the adhesive tray 540.

Figure 11:
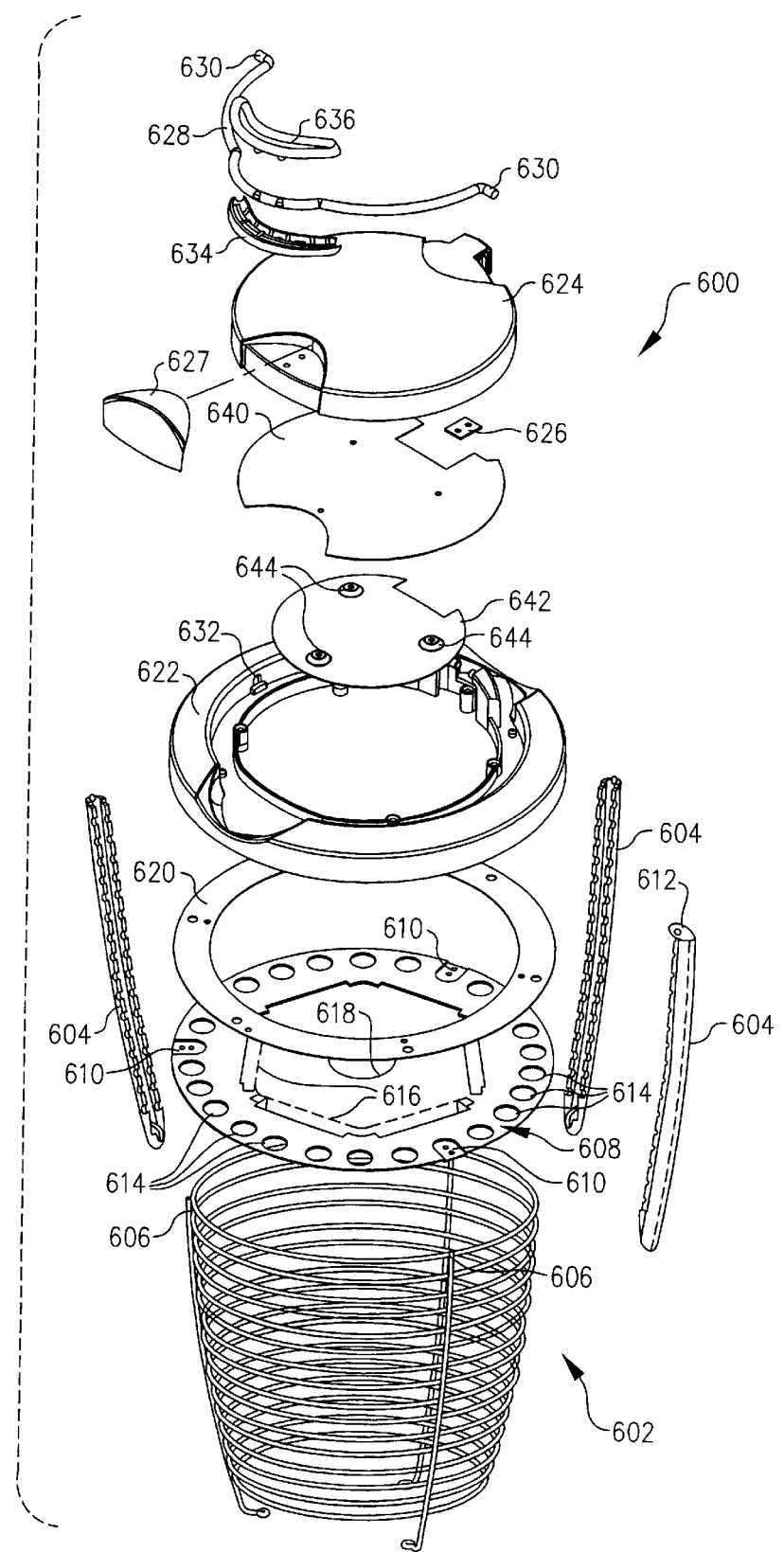
FIG. 11 is a perspective view of a top assembly that may be used in the mosquito and biting insect attracting apparatus of FIG. 1 or 2 in accordance with one aspect of the present invention.
Figure 12:
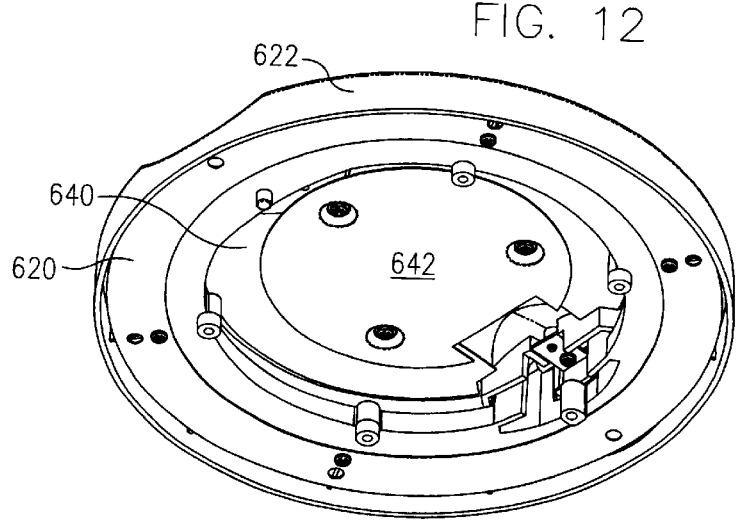
FIG. 12 is an assembled, bottom, perspective view of a cap for the top assembly of FIG. 11.

The top assembly 600 is shown in detail in FIGS. 1, 2, and 11. A cage 602, formed for example of wire steel, is provided that extends around the top of the mosquito and biting insect attracting apparatus 20. The cage 602 prevents accidental contact with the adhesive trays 502, but easily allows the passage of biting insects therethrough. Three ribs 604 extend along edges of the cage 602, and are attached to the top of the waist assembly 200 in a suitable manner, such as by fasteners or tabs. The cage 602 includes three threaded connecters 606 extending from a top edge thereof. A thermal hat 608 is attached to the top of the cage 602, and includes holes 610 that extend over the connectors. Flanges 612 on the top end of the ribs 604 also include holes that fit on the connectors 606. A female threaded fastener, such as a nut, may be used to connect the flanges 612 and the thermal hat to the top of the cage 602.

The thermal hat 608 includes a series of holes 614 around its periphery, and spaced inward from its perimeter. Slots 616 are spaced inwardly from the holes 614, and a central hole 618 is centered between the slots 616. When the mosquito and biting insect attracting apparatus 20 is assembled, the thermal hat 608 rests just over the thermal lure 300, and is attached to the tabs 350 on the outer cylinder. The thermal hat 608 is preferably formed of a thermally-conductive material, such as aluminum, and aids in heat dissipation of the exhaust in the thermal lure 300. The holes 614 and 618 aid in air and exhaust mixture, further aiding in heat dissipation, and permit the exhaust to exit over the adhesive trays 502.

When the adhesive trays 502 are installed, they are inserted into the slots 616, and onto the rails 509. During operation of the thermal lure 300, the heat emanating from the outer cylinder 314 heats the adhesive trays 502. Preferably, it is the outside surface of the adhesive trays that is maintained at a insect lure temperature range, as described below. To this end, the adhesive trays 502 are part of the thermal lure 300.

A cap ring baffle 620 is attached over the thermal hat 608, and a cap ring 622 fits over the cap ring baffle. A cap 624 is hinged to the cap ring 622, for example by a hinge plate 626. The cap 624 includes a grip 627 for aiding in opening of the cap. A handle 628 is also attached to the cap ring 622, for example by pins 630 that extend into slots 632 in the cap ring. The handle 628 may include front and rear gripping portions 634, 636 for aiding in gripping the handle. Alternatively, only the wire handle may be provided, or other structures may be provided for carrying the mosquito and biting insect attracting apparatus 20.

Further baffling may be incorporated into the cap 624 to avoid hot spots in the mosquito and biting insect attracting apparatus 20. For example, upper and lower baffles 640, 642 may be mounted in the underside of the cap 624 to aid in exhaust dissemination. The upper baffle 640 is a plate that is contoured to fit into the upper, underside of the cap 624. The lower baffle 642 is a circular-shaped plate that includes protrusions 644 on its top for spacing the upper baffle 640 from the upper baffle. Each of these elements and the cap 624 and cap ring 622 are preferably made of a thermally-conductive material, such as aluminum or steel. The exhaust exiting the thermal hat 608 hits the lower surface of the lower baffle 642. The thermal conductivity of the lower baffle 642 absorbs much of the heat remaining in the exhaust, and projections 644 transfer some of the absorbed heat to the upper baffle 640, which in turn transfers heat to the cap 624 and the cap ring 622. The upper and lower baffles 640, 642 and the cap 624 and cap ring 622 thus act as heat sinks, where much of the remaining heat in the exhaust may be dissipated. The baffles 640, 642 partially shield the cap 642, preventing the cap 642 from being heated to high, and avoiding a hot spot on the mosquito and biting insect attracting apparatus 20.

Raising the cap 624 provides access to the adhesive trays 502 and the octenol strip 400. In this manner, the adhesive trays 502 may be readily replaced, when for example they become filled with biting insects, or when they become dirty. In addition, the octenol strip 400 may be replaced when the octenol in the strip has evaporated.

The handle 628 provides a mechanism by which the mosquito and biting insect attracting apparatus 20 may be easily carried, even while in operation. In this manner, the mosquito and biting insect attracting apparatus 20 may be placed in a desired place or may be removed when it is in the way.

The mosquito and biting insect attracting apparatus 20 provides an inexpensive solution for the control of mosquitoes and biting insects. It is fully portable, and thus may be used in camping and boating environments. The embodiment of the mosquito and biting insect attracting apparatus 22 shown in FIG. 2 may have its legs removed or folded, along with the small propane tank 106, permitting the mosquito and biting insect attracting apparatus 22 to be stored in a box and transported, for example, to a camp area.

The inventors have found that the small propane tank 106 provides sufficient fuel for the mosquito and biting insect attracting apparatus 20 to operate about 3 hours a day for approximately two weeks. If desired, as described above, the octenol strip 400 may be sized and arranged so that the octenol on the octenol strip 400 evaporate in approximately the same amount of time. Thus, maintenance of the mosquito and biting insect attracting apparatus 20 would require only that the small propane tank 106 be replaced or refilled, and that the octenol strip 400 be replaced, once every two weeks. Occasional replacement of the adhesive trays 502 may also be needed, especially where the trays are full of mosquitoes or other biting insects, or when the trays become dirty.

The thermal lure 300, the chemical biting insect attractant (e.g., the octenol in the octenol strip 400), and the CO2 generated by the burner tube 202 simulate a small animal, thus attracting mosquitoes and other biting insects to the mosquito and biting insect attracting apparatus 20. Thus attracted, the mosquitoes and biting insects stick to the adhesive in the adhesive trays 502, where they die and can be removed by replacing the adhesive trays 502.

The baffles, connector arms, and other heat transfer and dissipation elements of the thermal lure 300 and the top assembly 600 assure that the outside temperature of the adhesive trays 502 are substantially constant. As used herein, "substantially constant" means that the surfaces fall within a range, preferably a biting insect lure range, for example similar to that of a small animal, such as within the range of 95 to 115 degrees Fahrenheit. The substantially constant heat signature or footprint is desirable for attracting mosquitoes and other biting insects. In summary, combustion in the burner tube 202 burns in the inner cylinder 310. The baffle 326 and the inner roof 340 direct exhaust outward and mix the exhaust with ambient air, which enters through the gap between the outer cylinder 314 and the base ring 302. The mixture of exhaust and ambient air travels upward through the central cylinder 312, and travels upward through the hole 354 in the cap 348. There the exhaust is further mixed with ambient air, which is supplied through the holes 352 around the periphery of the cap 348. The mixture of exhaust and air travels upward through the central hole 618 in the thermal hat 608, where it encounters the cap 624 and cap ring 622 and their baffles 620, 642, 640, is forced downward through the holes 614 at the periphery of the thermal hat 608. Each of the elements which the exhaust comes in contact is thermally conductive, and acts as a thermal sink to prevent hot spots.

Thus, the exhaust of the flame in the burner tube 202, having CO2 therein, exits out of the holes 614 in the thermal hat 608 and over the surface of the adhesive trays 502. This CO2 and the octenol produced by the octenol strip 400 attract mosquitoes and biting insects from far distances. The mosquitoes and biting insects are further attracted to the heat of the adhesive trays 502, supplied by the thermal lure 300, and specifically by the outer cylinder 314. In this manner, the outer surface of the adhesive trays 502 is the outermost surface of the thermal lure 300, and the surface to which the insects are attracted. The attraction is not diminished, because the structure of the thermal lure 300 causes the outer surface of the outer cylinder 314, and therefore the adhesive trays 502, to maintain a substantially constant temperature. Moreover, as the exhaust is cooled as it flows through the thermal lure 300 and the cap 624 and the cap ring 622 so that it is emitted out the holes 618 in the thermal cap 608 at the substantially constant temperature.

The structure of the thermal lure 300 may be modified as necessary, but preferably is configured to provide the substantially constant temperature at its outside surface. For example, two or more of the elements may be formed as one element, or one or more of the elements may not be used at all. However, the inventor have found that the structure of the thermal lure 300 shown and described works particularly well for providing the substantially constant temperature.

The control knob 216 provides an adjustment mechanism for adjustment of the amount of combustion within the burner tube 202. The inventors have found that the flame needed for maintaining the correct heat signature on the surface of the thermal lure 300 is largely dependent upon the ambient temperature. For example, when the ambient temperature is lower, such as 70 degrees Fahrenheit, the amount of flame needed to keep the outside surface of the thermal lure 300 between 95 and 115 degrees Fahrenheit is more than that needed when the temperature is 90 degrees. Thus, to aid a user in setting the flame of the burner tube 202 to the correct height, the indicia 232 are provided. A user simply rotates the indicator 234 of the control knob 216 to match the current ambient temperature, and the propane flow and therefore the flame height are properly set. The change in flow of propane is minor, but overcomes the difference in outer temperature of the adhesive trays 502 that may be caused by varied outside temperatures. As one example, the BTU output of the burner tube may be 350 BTU at 70 degrees, and 200 BTU at 100 degrees.

Figure 14:
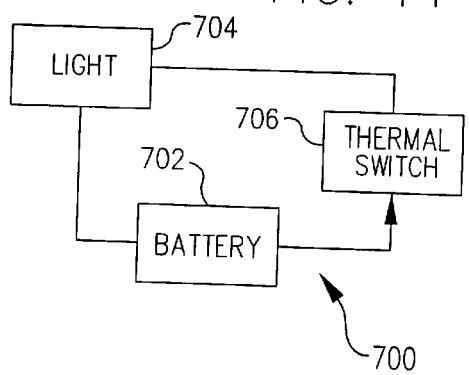
FIG. 14 is a simplified circuit diagram showing a operation indicator in accordance with one aspect of the present invention.

FIG. 14 shows an electrical diagram 700 for an operating indicator that may be used with the present invention. The operating indicator includes a battery 702, such as a pair of D-cell batteries, wired to a light 702, such as a light bulb. A thermal switch 706 is wired in the circuit with the battery 702 and the light 704. The battery 702 may be mounted in, for example, the waist assembly 200 or 202. The thermal switch 706 is preferably mounted above the burner tube 202, or in the vicinity of the thermal lure, and is positioned in a "normally opened" position. When the mosquito and biting insect attracting apparatus 20 is at an operating temperature, e.g., 95 to 115 degrees Fahrenheit, the thermal switch closes, closing the circuit, and allowing the lamp 704 to light. The light 704 may be mounted in a conspicuous location, such as on top of the cap ring 622. The operating indicator may be used to indicate that a flame in the burner tube 202 has not gone out, for example in high winds or when the propane has been expended.

Figure 15:
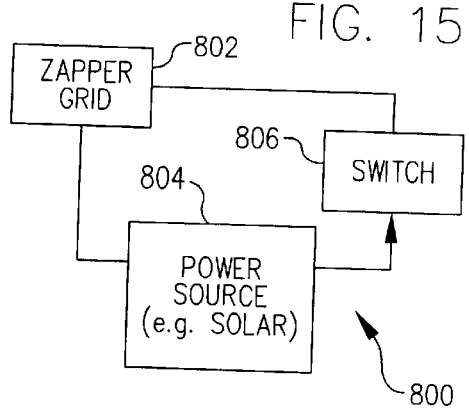
FIG. 15 is a simplified circuit diagram showing a mosquito and biting insect attracting apparatus that may be used with the present invention.

Other killing or trapping mechanisms may be used with the mosquito and biting insect attracting apparatus 20. For example, in FIG. 15, a bug elimination mechanism 800 is shown including a bug zapper 802, such as an electrified grid. The electrified grid 802 is wired to a power source, which may be batteries, solar, or an AC source. A switch 806 in the circuit turns the zapper grid "on." The electrified grid 802 may be mounted in place of the sticky adhesive assembly 500, so that it may eliminate bugs as they try to approach the thermal lure 300.

If the electrified grid 802 is used, then the outer surface of the thermal lure 300 is the outer cylinder 314 instead of the outside surfaces of the adhesive trays 502. Accordingly, less combustion is needed in the thermal lure 300 to obtain and maintain the substantially constant temperature at the outer surface, because there is not the associated temperature drop due to the insulating nature of the adhesive trays 502. The inventors estimate that the adhesive trays 502, when spaced about ¼ inch from the outer cylinder 314, cause a temperature drop from the outer cylinder 314 of approximately 5 to 10 degrees Fahrenheit.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A mosquito and biting insect attracting apparatus, comprising:
    a mechanism for combusting fuel, the mechanism configured to combust fuel in a combustion location;
    a thermal lure mounted over or surrounding the combustion location, the thermal hire having an outer surface and a beat dissipating structure;
    an insect trap which kills insects as a result of contact therewith but not by heat and mounted on at least a portion of the outer surface;
    the outer surface and the heat dissipating structure being configured and arranged such that heat of fuel combusted by the mechanism at the combustion location is absorbed by the heat dissipating structure and is distributed by the heat dissipating structure over the outer surface so that substantially the entirety of the outer surface including the insect trap, as well as any exhaust exiting the thermal lure adjacent to the insect trap are maintained within a substantially constant temperature range when fuel is combusted by the mechanism, the substantially constant temperature range representing a temperature range to which mosquitoes or biting insects are attracted.

2. The mosquito and biting insect attracting apparatus of claim 1, wherein the mechanism comprises a burner for producing a flame.

3. The mosquito and biting insect attracting apparatus of claim 2, further comprising a fuel tank connected to the burner, wherein the fuel tank is mounted below the mechanism.

4. The mosquito and biting insect attracting apparatus of claim 3, further comprising a skirt mounted around the fuel tank.

5. The mosquito and biting insect attracting apparatus of claim 3, further comprising removable or rotatable legs mounted around the fuel tank.

6. The mosquito and biting insect attracting apparatus of claim 1, wherein the mechanism comprises an adjustment mechanism configured to permit a user to manually adjust the heat output of the mechanism, and a plurality of settings for the adjustment mechanism, each of which represent a particular operating condition and wherein placing the adjustment mechanism at a particular setting causes a heat output required to maintain the outer surface at the substantially constant temperature range for a particular operating condition associated with the particular setting, whereby a user may manually adjust the adjustment mechanism for a particular operating condition.

7. The mosquito and biting insect attracting apparatus of claim 6, wherein the plurality of settings each comprise different ambient temperatures at which the mosquito and biting insect attracting apparatus may operate.

8. The mosquito and biting insect attracting apparatus of claim 7, wherein a setting for operating the mosquito and biting insect attracting apparatus at an ambient temperature of 70 degrees represents a heat output between 300 and 400 BTU's.

9. The mosquito and biting insect attracting apparatus of claim 8, wherein the setting for operating the mosquito and biting insect attracting apparatus at an ambient temperature of 70 degrees represents a heat output between 345 and 355 BTU's.

10. The mosquito and biting insect attracting apparatus of claim 7, wherein a setting for operating the mosquito and biting insect attracting apparatus at an ambient temperature of 100 degrees represents a heat output of approximately 200 BTU's.

11. The mosquito and biting insect attracting apparatus of claim 7, wherein the plurality of settings comprise indicia representing ambient temperatures at which the mosquito and biting insect attracting apparatus may operate, and the adjustment mechanism comprises an indicator tat may be aligned with the indicia.

12. The mosquito and biting insect attracting apparatus of claim 1, further comprising an operating indicator configured to indicate that fuel is being combusted by the mechanism.

13. The mosquito and biting insect attracting apparatus of claim 12, wherein the operating indicator comprises a thermal switch that is configured to be in a first condition when fuel is not combusted in the mechanism, and to switch to a second condition when fuel is being combusted in the mechanism.

14. The mosquito and biting insect attracting apparatus of claim 13, wherein the thermal switch cuts power to a light when the thermal switch is in the first position.

15. The mosquito and biting insect attracting apparatus of claim 1, wherein the insect trap comprises an electronic grid.

16. The mosquito and biting insect attracting apparatus of claim 1, wherein the insect trap comprises an adhesive substance to which insects may stick.

17. The mosquito and biting insect attracting apparatus of claim 16, wherein the insect trap comprises a removable adhesive tray having the adhesive substance thereon.

18. The mosquito and biting insect attracting apparatus of claim 17, further comprising a plurality of removable adhesive trays having the adhesive substance thereon.

19. The mosquito and biting insect attracting apparatus of claim 17, wherein the removable adhesive tray is mounted around the heat dissipating structure.

20. The mosquito and biting insect attracting apparatus of claim 19, further comprising a cage mounted around the outer surface, wherein the removable adhesive tray is mountable between the cage and the heat dissipating structure.

21. The mosquito and biting insect attracting apparatus of claim 20, further comprising a cap mounted such that it may close the removable adhesive tray between the cage and the outer surface, and so the removable adhesive tray may be accessed for removal by opening the cap.

22. The mosquito and biting insect attracting apparatus of claim 21, further comprising a chemical insect attractant removably mounted between the location and the cage, so that the cap may close the chemical insect attractant between the cage and the outer surface, and the chemical insect attractant may be accessed for removal by opening the cap.

23. The mosquito and biting insect attracting apparatus of claim 20, further comprising a plurality of removable adhesive trays having the adhesive substance thereon, each adhesive fray mounted around the outer surface and between the outer surface and the cage.

24. The mosquito and biting insect attracting apparatus of claim 23, wherein the number of removable adhesive tray is two, and wherein the two removable adhesive trays are foldable in two locations so that each of the cross-sections of the two removable adhesive trays may be formed into half-hexagons, whereby the two half-hexagons may be mounted around the outer surface to surround the outer surface.

25. The mosquito and biting insect attracting apparatus of claim 24, further comprising guides on the sides of the two half-hexagons for fitting onto rails that are mounted outside the outer surface.

26. The mosquito and biting insect attracting apparatus of claim 1, further comprising a chemical insect attractant removably mounted adjacent to the outer surface.

27. The mosquito and biting insect attracting apparatus of claim 26, wherein the chemical insect attractant comprises a tray having the chemical insect attractant therein.

28. The mosquito and biting insect attracting apparatus of claim 27, further comprising:
  a cage mounted around the outer surface, wherein the tray is mountable between the cage and the location; and
  a cap mounted such that it may close the tray between the cage and the location, and so the tray may be accessed for removal by opening the cap.

29. The mosquito and biting insect attracting apparatus of claim 1, wherein the heat dissipating structure comprises an inner cylinder for surrounding the location.

30. The mosquito and biting insect attracting apparatus of claim 29, wherein the heat dissipating structure further comprises an outer cylinder surrounding the inner cylinder, the outer surface comprising an outer surface of the outer cylinder.

31. The mosquito and biting insect attracting apparatus of claim 30, further comprising at least one thermally-conductive connector arm for connecting the inner and outer cylinders.

32. The mosquito and biting insect attracting apparatus of claim 31, wherein the at least one connector arm extends downward from the inner cylinder to the outer cylinder.

33. The mosquito and biting insect attracting apparatus of claim 30, further comprising a baffle connected in the inner cylinder and configured to direct at least partly sideways exhaust that is created by combustion produced by the mechanism.

34. The mosquito and biting insect attracting apparatus of claim 33, wherein the baffle is mounted within the inner cylinder and is spaced downward from a top of the inner cylinder, and further comprising a roof for the inner cylinder that fits over the top of the inner cylinder and is configured to direct at least partly sideways exhaust created by combustion produced by the mechanism.

35. The mosquito and biting insect attracting apparatus of claim 30, further comprising a central cylinder mounted between the inner cylinder and the outer cylinder.

36. The mosquito and biting insect attracting apparatus of claim 35, further comprising at least one connector arm for connecting the inner and outer cylinders, and at least one connector arm for connecting the inner cylinder and the central cylinder.

37. The mosquito and biting insect attracting apparatus of claim 35, further comprising a cap for fitting over the central cylinder, the cap comprising holes for emitting a flow of fluid upward out of or downward into a space between the central cylinder and the outer cylinder, and at least one hole for permitting a flow of fluid upward from or downward into the central cylinder.

38. The mosquito and biting insect attracting apparatus of claim 35, further comprising a structure for directing exhaust from the central cylinder to the outer surface of the outer cylinder, the exhaust emitted from combustion produced by the mechanim.

39. The mosquito and biting insect attracting apparatus of claim 38, wherein the structure comprises:
  a thermal hat mounted over the central cylinder, the thermal hat comprising outlet holes for emitting a flow of fluid downward to the outside of the outer cylinder, and an exhaust hole for permitting a flow of fluid upward from the central cylinder; and
  an enclosed covering over the outlet holes and the exhaust hole.

40. The mosquito and biting insect attracting apparatus of claim 35, further comprising a structure for directing exhaust from the inner cylinder to the outer surface of the outer cylinder, the exhaust emitted from combustion produced by the mechanism.

41. The mosquito and biting insect attracting apparatus of claim 40, wherein the structure comprises:
  a thermal hat mounted over the inner cylinder, the thermal hat comprising outlet holes for emitting a flow of fluid downward to the outside of the outer cylinder, and an exhaust hole for permitting a flow of fluid upward from the inner; and an enclosed covering the outlet holes and the exhaust hole.

42. The mosquito and biting insect attracting apparatus of claim 1, wherein the heat dissipating structure comprises a thermal conductive material.

43. The mosquito and biting insect attracting apparatus of claim 1, further comprising a structure for directing from combustion in the mechanism and emitted from the heat dissipating structure to the outer surface.

44. The mosquito and biting insect attracting apparatus of claim 1, wherein the substantially constant temperature range is a range of temperatures between 95 to 115 degrees Fahrenheit, inclusive.

* * * * *